United States Patent
Zoll et al.

(10) Patent No.: US 10,409,789 B2
(45) Date of Patent: Sep. 10, 2019

(54) METHOD AND SYSTEM FOR ADAPTIVELY IMPUTING SPARSE AND MISSING DATA FOR PREDICTIVE MODELS

(71) Applicant: Oracle International Corporation, Redwood Shores, CA (US)

(72) Inventors: Michael Zoll, Foster City, CA (US); Yaser I. Suleiman, Santa Clara, CA (US); Subhransu Basu, Fremont, CA (US); Angelo Pruscino, Los Altos, CA (US); Wolfgang Lohwasser, Munich (DE); Wataru Miyoshi, Redwood (CA); Thomas Breidt, Munich (DE); Thomas Herter, Santa Clara, CA (US); Klaus Thielen, Munich (DE); Sahil Kumar, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 164 days.

(21) Appl. No.: 15/707,500

(22) Filed: Sep. 18, 2017

(65) Prior Publication Data
US 2018/0081914 A1    Mar. 22, 2018

Related U.S. Application Data

(60) Provisional application No. 62/395,845, filed on Sep. 16, 2016.

(51) Int. Cl.
*G06F 16/30*       (2019.01)
*G06F 16/215*      (2019.01)
(Continued)

(52) U.S. Cl.
CPC ........ *G06F 16/215* (2019.01); *G06F 11/3409* (2013.01); *G06F 11/3452* (2013.01);
(Continued)

(58) Field of Classification Search
CPC .... G06F 11/3452; G06F 16/215; G06N 7/005
See application file for complete search history.

(56) References Cited

U.S. PATENT DOCUMENTS

| | | | |
|---|---|---|---|
| 5,408,406 A | 4/1995 | Mathur et al. | |
| 5,477,449 A | 12/1995 | Lino | |

(Continued)

FOREIGN PATENT DOCUMENTS

| | | |
|---|---|---|
| EP | 1717736 A2 | 11/2006 |
| WO | WO 2004/053659 A2 | 6/2004 |
| WO | WO 2016/086138 A1 | 6/2016 |

OTHER PUBLICATIONS

Book entitled "Business Survey Methods", by Cox et al., dated Mar. 2, 1995.*

(Continued)

*Primary Examiner* — Mahesh H Dwivedi
(74) *Attorney, Agent, or Firm* — Vista IP Law Group, LLP

(57) ABSTRACT

Described is an approach that provides an adaptive solution to missing data for machine learning systems. A gradient solution is provided that is attentive to imputation needs at each of several missingness levels. This multilevel approach treats data missingness at any of multiple severity levels while utilizing, as much as possible, the actual observed data.

15 Claims, 14 Drawing Sheets

(51) Int. Cl.

| | | |
|---|---|---|
| *G06K 9/62* | (2006.01) | |
| *G06F 11/34* | (2006.01) | |
| *G06N 7/00* | (2006.01) | |
| *H04L 12/24* | (2006.01) | |
| *G06N 20/20* | (2019.01) | |
| *G06N 20/00* | (2019.01) | |
| *H04L 12/26* | (2006.01) | |

(52) U.S. Cl.
CPC .......... *G06K 9/6256* (2013.01); *G06N 7/005* (2013.01); *G06N 20/20* (2019.01); *H04L 41/069* (2013.01); *H04L 41/142* (2013.01); *G06N 20/00* (2019.01); *H04L 41/0695* (2013.01); *H04L 41/0823* (2013.01); *H04L 43/02* (2013.01)

(56) References Cited

U.S. PATENT DOCUMENTS

| | | | |
|---|---|---|---|
| 6,144,952 | A | 11/2000 | Keeler et al. |
| 6,314,414 | B1 | 11/2001 | Keeler et al. |
| 7,006,900 | B2 | 2/2006 | Zhenduo et al. |
| 7,333,917 | B2 | 2/2008 | Greis et al. |
| 7,346,471 | B2 | 3/2008 | Chickering et al. |
| 7,379,846 | B1 | 5/2008 | Williams et al. |
| 7,599,893 | B2 | 10/2009 | Sapir et al. |
| 7,702,598 | B2 | 4/2010 | Saidi et al. |
| 7,725,300 | B2 | 5/2010 | Pinto et al. |
| 7,730,003 | B2 | 6/2010 | Pinto et al. |
| 7,801,839 | B2 | 9/2010 | Kates et al. |
| 7,882,394 | B2 | 2/2011 | Hosek et al. |
| 8,214,308 | B2 | 7/2012 | Chu |
| 8,244,654 | B1 | 8/2012 | Hobgood et al. |
| 8,364,613 | B1 | 1/2013 | Lin et al. |
| 8,370,280 | B1 | 2/2013 | Lin et al. |
| 8,374,974 | B2 | 2/2013 | Chen et al. |
| 8,706,659 | B1 | 4/2014 | Mann et al. |
| 8,732,222 | B2 | 5/2014 | Horvitz et al. |
| 8,843,423 | B2 | 9/2014 | Chu et al. |
| 8,843,427 | B1 | 9/2014 | Lin et al. |
| 9,141,911 | B2 | 9/2015 | Zhao et al. |
| 9,229,838 | B2 | 1/2016 | Chang et al. |
| 9,239,986 | B2 | 1/2016 | Lin et al. |
| 9,262,493 | B1 | 2/2016 | Dietrich |
| 9,285,504 | B2 | 3/2016 | Dannevik et al. |
| 9,349,103 | B2 | 5/2016 | Eberhardt et al. |
| 9,349,105 | B2 | 5/2016 | Beymer et al. |
| 9,443,194 | B2 | 9/2016 | Chu et al. |
| 9,467,355 | B2 | 10/2016 | Doering et al. |
| 9,489,630 | B2 | 11/2016 | Achin et al. |
| 9,536,052 | B2 | 1/2017 | Amarasingham et al. |
| 9,652,714 | B2 | 5/2017 | Achin et al. |
| 9,659,254 | B2 | 5/2017 | Achin et al. |
| 2003/0139908 | A1 | 7/2003 | Wegerich et al. |
| 2004/0167765 | A1 | 8/2004 | Ata |
| 2005/0234688 | A1* | 10/2005 | Pinto ............... G05B 17/02 703/6 |
| 2006/0173663 | A1 | 8/2006 | Langheier et al. |
| 2006/0247798 | A1 | 11/2006 | Subbu et al. |
| 2006/0248031 | A1* | 11/2006 | Kates ............... G16H 50/20 706/25 |
| 2009/0055139 | A1* | 2/2009 | Agarwal ............. G06Q 10/04 703/2 |
| 2012/0136896 | A1* | 5/2012 | Tseng ................ G06F 17/18 707/780 |
| 2013/0036082 | A1* | 2/2013 | Natarajan ............ G06Q 30/00 706/47 |
| 2013/0226842 | A1* | 8/2013 | Chu .................. G06N 5/025 706/12 |
| 2014/0058763 | A1 | 2/2014 | Zizzamia et al. |
| 2014/0046879 | A1 | 3/2014 | MacLennan et al. |
| 2014/0114746 | A1 | 4/2014 | Pani et al. |
| 2014/0207493 | A1* | 7/2014 | Sarrafzadeh ......... A61B 5/7264 705/3 |
| 2014/0316220 | A1 | 10/2014 | Sheldon |
| 2014/0343955 | A1 | 11/2014 | Raman |
| 2014/0344208 | A1 | 11/2014 | Ghasemzadeh et al. |
| 2014/0372346 | A1 | 12/2014 | Phillipps et al. |
| 2014/0379310 | A1 | 12/2014 | Ramachandran et al. |
| 2015/0067411 | A1* | 3/2015 | Xia ................ G06F 11/004 714/47.3 |
| 2016/0028599 | A1 | 1/2016 | Vasseur et al. |
| 2016/0092557 | A1 | 3/2016 | Stojanovic et al. |
| 2016/0267077 | A1 | 9/2016 | Bahgat et al. |
| 2016/0328406 | A1 | 11/2016 | Convertino et al. |
| 2016/0335550 | A1 | 11/2016 | Achin et al. |
| 2016/0371601 | A1 | 12/2016 | Grove et al. |
| 2017/0262596 | A1* | 9/2017 | Sengupta ........... G06N 7/005 |
| 2018/0068033 | A1* | 3/2018 | Bandyopadhyay .... G06N 5/022 |

OTHER PUBLICATIONS

Article entitled "Hybrid Prediction Model with Missing Value Imputation for Medical Data", by Purwar et al., Copyright 2015.*
Collins, et al. "External validation of multivariable prediction models: a systematic review of methodological conduct and reporting", BMC Medical Research Methodology, Mar. 2014.
Razzaghi, et al. "Multilevel Weighted Support Vector Machine for Classification on Healthcare Data with Missing Values", PLoS ONE, May 2016.
Lakshminarayan, et al. "Imputation of missing data using machine learning techniques" KDD'96 Proceedings of the Second International Conference on Knowledge Discovery and Data Mining, Aug. 1996, pp. 140-145.
Somasundaram, et al. "Radial Basis Function Network Dependent Exclusive Mutual Interpolation for Missing Value Imputation", Journal of Computer Science, Sep. 2013.
Zhang, et al. "How to evaluate model performance in Azure Machine Learning Studio", Microsoft Azure, Mar. 2017.
Kadane, et al. "Methods and Criteria for Model Selection", Journal of the American Statistical Association, vol. 99, 2004, p. 279-290.
Banaee, et al. "Data Mining for Wearable Sensors in Health Monitoring Systems: A Review of Recent Trends and Challenges" Sensors (Basel), Dec. 2013, pp. 17472-17500.
Ghanbari, et al. "Semantic-Driven Model Composition for Accurate Anomaly Diagnosis", Jun. 2008, IEEE, International Conference on Autonomic Computing.
Chen, et al. "Analysis of service diagnosis improvement through increased monitoring granularity" Springer US, Software Qual J, Jun. 2017.
ServiceNow Inc., "Get to the Root of Your Business Service Quality Issues", 2015.
Dynatrace, "Root cause analysis of infrastructure issues", Retrieved on Feb. 2017 from https://help.dynatrace.com/monitorcloudvirtualizationandhosts/hosts/rootcauseanalysisofinfrastructureissues/.
Wagner, et al. "Measurement Adherence in the Blood Pressure Self-Measurement Room", Telemed J E Health, Nov. 2013, pp. 826-833.
Bala Deshpande "Why predictive maintenance is more relevant today than ever before", Soliton Technologies, Jan. 2014.
Sengupta "Predictive Modeling: 'Ensemble of Ensemble'" Analytics Magazine, Nov./Dec. 2015.
"What is the proper name of a model that takes as input the output of another model?" Jan. 2015, from http://stats.stackexchange.com/questions/135427/what-is-the-proper-name-of-a-model-that-takes-as-input-the-output-of-another-mod.
Cherkassky, et al. "Multiple Model Estimation: A New Formulation for Predictive Learning" submitted to IEE Transaction on Neural Network, 2002.
Meng, et al. "Predictive Modeling Using SAS Visual Statistics: Beyond the Prediction" SAS Institute Inc., Sesug Proceedings 2015.
Tong, et al. "Decision Forest: Combining the Predictions of Multiple Independent Decision Tree Models" J. Chem. Inf. Comput. Sci., Feb. 2003, 43, pp. 525-531.
Yi, et al. "Predictive model performance: offline and online evaluations", ACM SIGKDD Conference, Aug. 2013, pp. 1294-1302.

(56) References Cited

OTHER PUBLICATIONS

J. Li, et al. "Machine learning based online performance prediction for runtime parallelization and task scheduling," 2009 IEEE International Symposium on Performance Analysis of Systems and Software, Boston, MA, pp. 89-100.
MicroStrategy Inc. "Inputs for predictive metrics", Advanced Reporting Guide: Enhancing Your Business Intelligence Application, 2013, pp. 782-791.
Subramanian, et al. "Differentially Sampled Anomaly Detection System based on Outlier Identification Technique" Nov. 2015, Indian Journal of Science and Technology, vol. 8(32).
Radoux, et al. "Automated Training Sample Extraction for Global Land Cover Mapping" Remote Sens. May 2014, pp. 3965-3987.
Stang, et al. "The Effect of Data Quality on Data Mining—Improving Prediction Accuracy by Generic Data Cleansing", In International Conference on Information Quality ICIQ, Jan. 2010.
Dienst, et al. "Automatic Anomaly Detection in Offshore Wind SCADA Data", Conference: Wind Europe Summit, Sep. 2016.
Munirathinam, et al. "Predictive Models for Equipment Fault Detection in the Semiconductor Manufacturing Process" IACSIT International Journal of Engineering and Technology, Aug. 2016, vol. 8, No. 4.

\* cited by examiner

| Time | Signal_1 | Signal_2 | Signal_3 |
|------|----------|----------|----------|
| T1   | value    | no value | value    |
| T2   | value    | value    | no value |
| T3   | value    | value    | value    |
| T4   | value    | value    | value    |
| T5   | value    | value    | value    |
| T6   | value    | value    | no value |
| T7   | value    | no value | value    |
| T8   | no value | value    | value.   |
| T9   | no value | no value | value    |
| T10  | value    | no value | no value |

FIG. 3A

Determine missing percentage for each pattern

| Pattern | Signal 1 | Signal 2 | Signal 3 | Count | | Percentage |
|---------|----------|----------|----------|-------|---|------------|
| 1 | V | V | V | 3 | ⇧ | 30% |
| 2 | V | V | NV | 2 | ⇧ | 20% |
| 3 | V | NV | V | 2 | ⇧ | 20% |
| 4 | NV | V | V | 1 | ⇧ | 10% |
| 5 | V | NV | NV | 1 | ⇧ | 10% |
| 6 | NV | V | NV | 0 | ⇧ | 0% |
| 7 | NV | NV | V | 1 | ⇧ | 10% |
| 8 | NV | NV | NV | 0 | ⇧ | 0% |
| | | | | | | 100%  Total |

FIG. 4B

METHOD AND SYSTEM FOR ADAPTIVELY IMPUTING SPARSE AND MISSING DATA FOR PREDICTIVE MODELS

CROSS-REFERENCE TO RELATED APPLICATIONS

The present application claims the benefit of priority to U.S. Provisional Application No. 62/395,845, filed on Sep. 16, 2016, which is hereby incorporated by reference in its entirety. The present application is related to U.S. application Ser. No. 15/707,417, entitled "METHOD AND SYSTEM FOR CLEANSING TRAINING DATA FOR PREDICTIVE MODELS", U.S. application Ser. No. 15/707,454, entitled "METHOD AND SYSTEM FOR ADAPTIVELY REMOVING OUTLIERS FROM DATA USED IN TRAINING OF PREDICTIVE MODELS", and U.S. application Ser. No. 15707536, entitled "METHOD AND SYSTEM FOR PERFORMING CONTEXT-AWARE PROGNOSES FOR HEALTH ANALYSIS OF MONITORED SYSTEMS", all of which are filed on even date herewith and which are hereby incorporated by reference in their entirety.

BACKGROUND

Database systems and database clusters are becoming increasingly larger and more complex. The horizontal expansion of computing component resources (e.g., more and more computing nodes, more and more storage-oriented devices, more and more communication paths between components, more and more processing modules and instances, etc.) coupled with the proliferation of high-performance component instrumentation results in systems capable of generating extremely high bandwidth streams of sensory data. Even a session of very short duration to capture such sensory data can result in an accumulation of correspondingly large volumes of raw data of very detailed complexity, which presents a large challenge to system administrators to perceive the meaning within the volume of data.

The problem is that given the size of modern database systems and clusters, it is becoming more and more difficult for administrators to efficiently manage the health and correct operational state of the technology given the quantities and complexities of data being collected for those databases. Conventional approaches often rely upon ad hoc logic that is notorious for having low-grade accuracy with regards to the current state of health of the system, and to then act upon their possibly inaccurate assessment of the state the of the system.

Machine learning has been proposed as a solution for managing and monitoring complex systems such as databases. Machine learning pertains to systems that allow a machine to automatically "learn" about a given topic, and to improve its knowledge of that topic over time as new data is gathered about that topic. The learning process can be used to derive an operational function that is applicable to analyze the data about that system, where the operational function automatically processes data that is gathered from the activity or system being monitored. This approach is useful, for example, when a vast amount of data is collected from a monitored system such that the data volume is too high for any manual-based approach to reasonably and effectively perform data review to identify patterns within the data, and hence automated monitoring is the only feasible way that can allow for efficient review of that collected data.

However, the quality of prediction results from applying machine learning is highly dependent upon the quality of the data that is provided to the machine learning system in the first place. The problem that often arises is that some of the data may end up being "missing" from the dataset that is expected to be collected and applied to the learning process and/or model calibration process. This may occur for many different reasons. For example, the issue could be caused by "unobserved signals", where the system undergoing observation just does not produce any data for certain signals due to certain monitored events not occurring during certain time periods, e.g., because of the type of workloads that typically produce those signals either were not running or were in a waiting state. In addition, the nature of the signal may be such that it is just naturally a sparsely populated type of data within the system. Other reasons may also exist, such as for example, a failure situation when a node/instance goes down and results in lowered amounts of data being observed in the monitored system.

Conventional approaches to address this problem suffer from various forms of efficiency and accuracy problems. For example, one possible solution is to simply drop any datapoint and/or dataset having missing items of signal data. However, this solution requires the loss of the data that was actually collected, where the data loss could create a high cost if the lost data patterns are significant and are not repeated again in other portions of the collected data. This approach may also increase the sparseness of the data for analysis, which may end up resulting in less accurate prediction models being produced. Another possible solution is to merely substitute fixed value into the missing data portions. For example, an average value for a particular signal may be used to replace a missing value for that signal in a set of data. However, this approach runs the risk of creating inaccurate models if there are particular locations in the signal data that should realistically deviate significantly from average values. Yet another approach is to apply simple imputation of values, such as by performing interpolation to fill in missing gaps in signal data. However, this approach is only really useful for small gaps in the data.

What is needed, therefore, is a method and/or system that overcomes the problems inherent in the prior approaches, and which permits resolution of missing data from collected data for model formation and/or calibration.

SUMMARY

According to some embodiments, described is an improved method, system, and computer program product that provides an adaptive approach to missing data for machine learning systems. A gradient solution is provided that is attentive to imputation needs at each of several missingness levels. The solutions provided by this method facilitates wider deployment and acceptance of machine learning products. In addition, this multilevel approach treats data missingness adequately at any of its severity levels while utilizing, as much as possible, the actual observed data. The multi-level adaptive approach has the capacity to handle sparse or largely missing data, thus facilitating the continuous operations of machine learning model recalibration.

Some embodiments adaptively handles missingness not only at low but also greater degrees. At low missingness, the present approach first employs iterative techniques to impute new values while relying heavily on observed data alone. As missingness increases, whether overall or in specific variables, imputation techniques used in the first level begin to lose robustness and become ineffective. The inventive approaches compensate by adding new data brought from external but closely related sources already kept in either trained models or succinct distribution formats. The compensation approach using external data is incremental and in proportion to missingness severity. If no observed data can be used, the approach handles this case by fully compensating via reliance on external sources.

Some embodiments of the invention provide an improved approach to implement proactive health prognostics for a clustered computing system based upon the improved imputation of training/calibration data.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 3A-F illustrate approaches to check for degrees of missing data according to some embodiments of the invention.

FIGS. 4A-B illustrates an approach to identify levels of missingness for signal patterns within a dataset according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As previously discussed, a known problem with existing machine learning solutions is that some of the data needed for model training/calibration may end up being missing from the dataset that is expected to be collected and applied to the learning process. This is problematic since many machine learning algorithms prefer to operate on full datasets without any missing information.

Embodiments of the present invention resolve these problems by recognizing that there are varying circumstances to the identification of missing data, and that different corrective actions can be taken for different levels of missing data within the system. In particular, an adaptive approach can be taken to impute missing data, where the specific choice of a particular imputation method can be chosen based at least in part upon one or more degrees of missingness for some or all of the data being evaluated.

Figure 1:
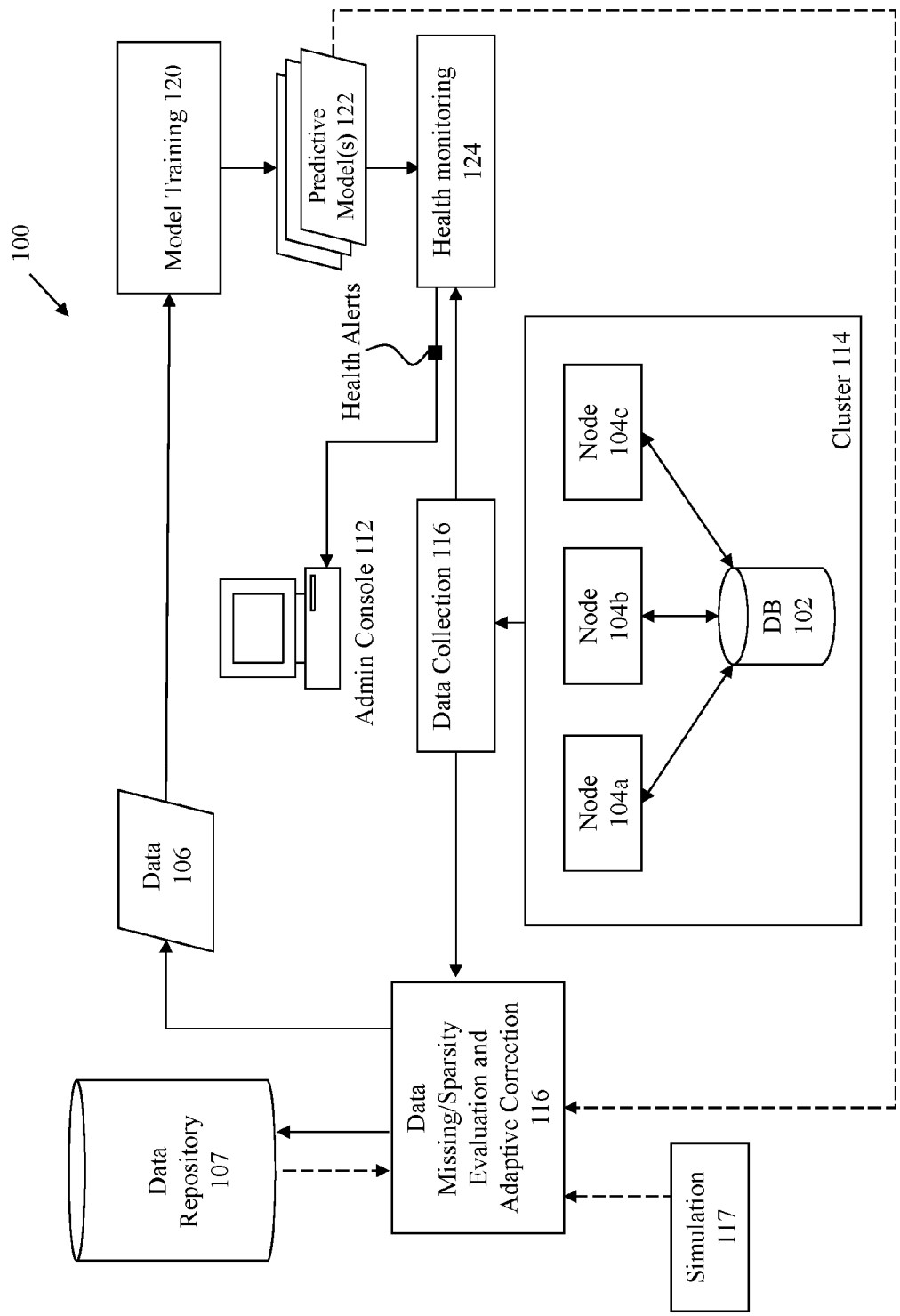
FIG. 1 illustrates a system for implementing adaptive imputation of missing data according to some embodiments of the invention.

FIG. 1 illustrates a system 100 for implementing adaptive imputation of missing data according to some embodiments of the invention. System 100 includes a data collector 116 that collects signal data from a database system/cluster 114. In the database field, a cluster refers to a system organization in which multiple servers/instances on a plurality of hardware nodes 104a-c connect to a single database 102. In such a system, the full data 106 collected from the database cluster 114 may include intra-node signals corresponding to data for individual nodes (e.g., memory and CPU utilization), inter-node signals that may correlate to behavior or activity pertaining to nodes (e.g., certain types of networking data), as well as database-centric signals that apply to the database-related components (e.g., database logging signals). It is noted that a datapoint collected from the monitored target may include tens or even hundreds of signals values that together describe the holistic current state of the target (a target could be, for instance, a database instance or its host).

The system includes a data missing/sparsity evaluation and adaptive correction module 116. This module assembles alternative imputation techniques to deal with missing data occurring at various degrees. As described in more detail below, various techniques are applied in a prioritized sequence to preserve as much of the observed information as possible, which compensate for any missing information gradually and on an as-needed basis. Therefore, the present multilevel treatment approach to missing data adapts to the degree of missingness exhibited by the data. The imputation techniques may draw upon external processing and/or data in order to address the missing data. For example, module 116 may access data from within data repository 107 to fill in missing data, may employ simulation 117 to fill gaps for missing data, and/or may employed predicted data values from one or more predictive models 122 to fill holes in collected data.

The data 106 (which has been corrected to address excessive missing/sparse data) is provided to a model training process 120, such as a supervised learning algorithm. The learning algorithm takes in the supplied set of input data 106, and uses that data to train the one or more models 122 that generates predictions in response to new data. Any suitable approach can be taken to perform model training for any suitable model type, including for example, decision trees, discriminant analysis, support vector machines, logistic regression, nearest neighbors, and/or ensemble classification models.

The predictive models 122 can be created and applied to perform many types of analysis tasks upon a system. For example, the predictive models 122 can be applied to perform health monitoring 124 for the database cluster 114. In this approach, the machine learning system performs automatic processing and transformation of large and extensive volumes of raw sensory and other diverse measurement data from the database cluster 114, where the learning model serves as the primary predictor and indicator of many of the database cluster aspects (e.g., current and predicted health state, and system availability). For example, applying the models 122 to perceived measurement data, events can be detected that potentially correlate to cluster health and performance states. Classified behavior can be identified that may be deemed to be normal behavior or some form of abnormal, anomalous, or fault behavior. Identification of abnormal/anomalous/fault behavior could result in generation of a health alert that is provided to the user or administrator, e.g., by way of messaging that is sent to the administrative console 112.

Figure 2:
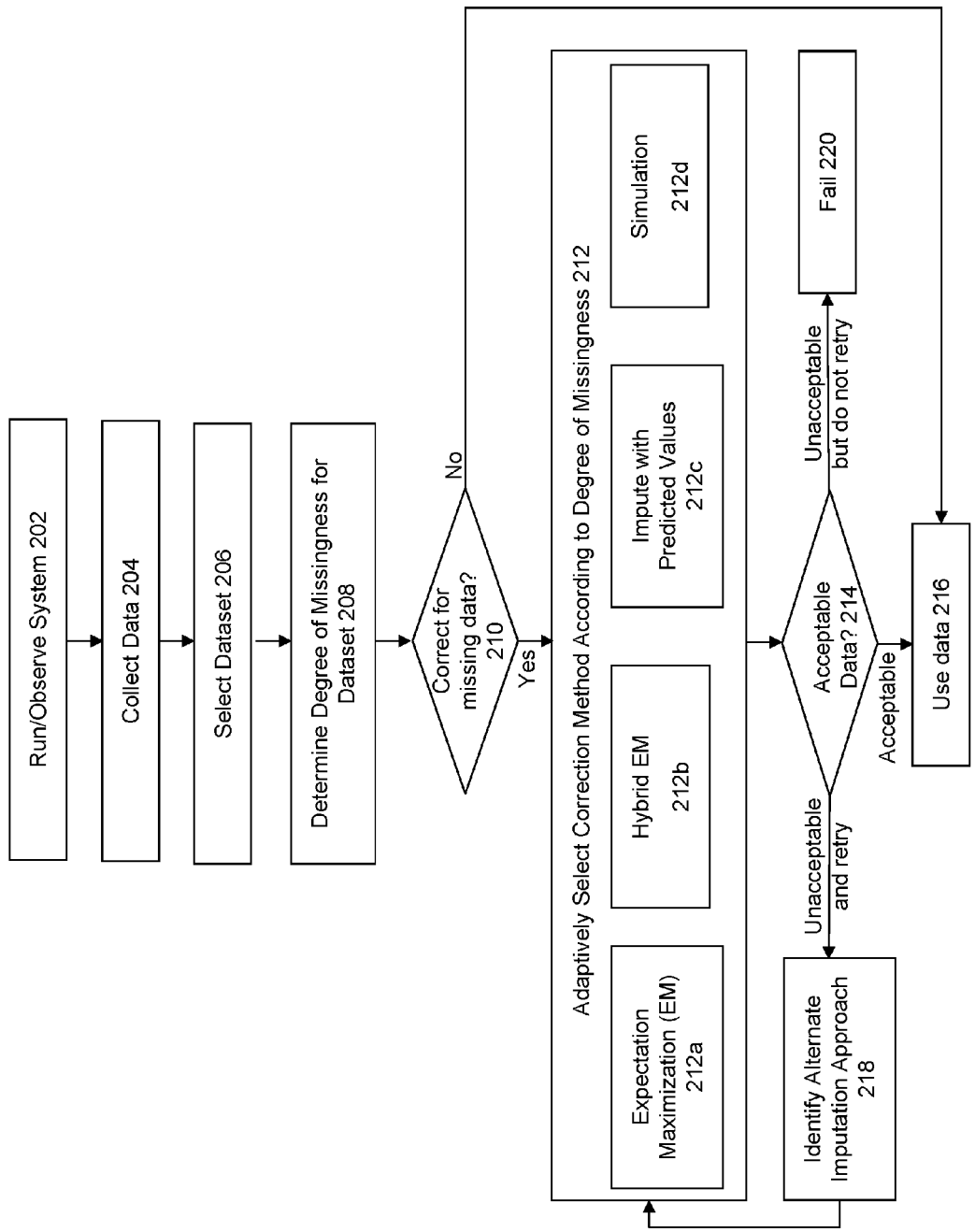
FIG. 2 shows a high-level flowchart of an approach to implement some embodiments of the invention.

FIG. 2 shows a high-level flowchart of an approach to implement some embodiments of the invention. At 202, a targeted system is observed for its behavior during its operation. The targeted system may be any entity, object, or hardware device to be monitored, such as for example, a database instance, processing node, and/or server.

For the system being observed, at 204, data is collected for that system. The set of data that is collected may include a large set of signal data from the monitored target that may corresponds to tens or even hundreds of signals and an array of their sampled data (e.g. observed values). Any type of data may be collected for each signal. For example, in one embodiment, each set of data for a given signal includes one or more of the following: (a) a signal identifier such as a signal number; (b) signal name; (c) a grouping value that correlates related signals together; (d) a specific machine learning technique/model pertaining to the signal; (e) an indicator of whether fault was detected for the signal and/or a fault value (such as "high" or "low"); (f) an observed value for the signal; and/or (g) a predicted value for the signal. The collected signal value may pertain to any information of interest pertaining to any metric collectible within the system, such as for example, a database-specific metric pertaining to one or more values directly obtained from operation of a database system (e.g., database logging or wait metrics). In addition, the signal may correspond to an intra-node signals obtained for components and/or metrics that are directly pertinent to a given node or instance (e.g., memory and CPU utilization). Another example signal may include inter-node signals that may correlate to behavior or activity pertaining to multiple nodes (e.g., inter-node networking metrics).

At 206, an additional processing action is taken to select the particular dataset that is to be employed for a model. This step may be taken to select the specific signals, from among all the signals for which data is collected, that would be appropriate for a given model. This is because different models may have different purposes in the machine learning system, and those different models may be generated using different sets of the signals that have been collected from the monitored system. An additional pre-processing step may be taken to scale down larger sets of data into a more compact dataset. This scaling down action may be implemented, for example, by taking every nth sample of data from the original collected data and/or by identifying significant clusters within the collected data and sampling from within the identified clusters.

At 208, a determination is made of the level of missingness for the data under examination. Some embodiments employ multiple ways to measure levels for data that may be missing from the collected dataset. A first approach is to check for the overall degree to which data is missing from the expected dataset. A second approach is to check the degree of missingness separately for each signal within the dataset. A third approach is to track the level of missingness for each signal pattern within the dataset. Each of these approaches are described in more detail below.

Figure 3B:
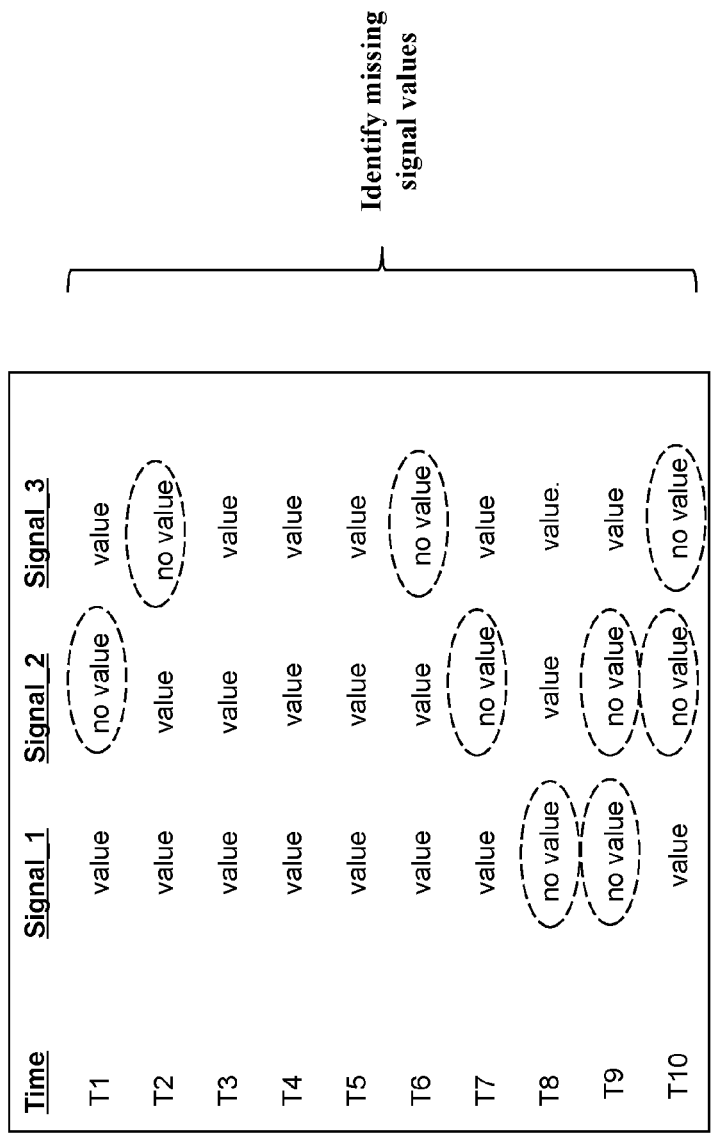
Figure 3C:
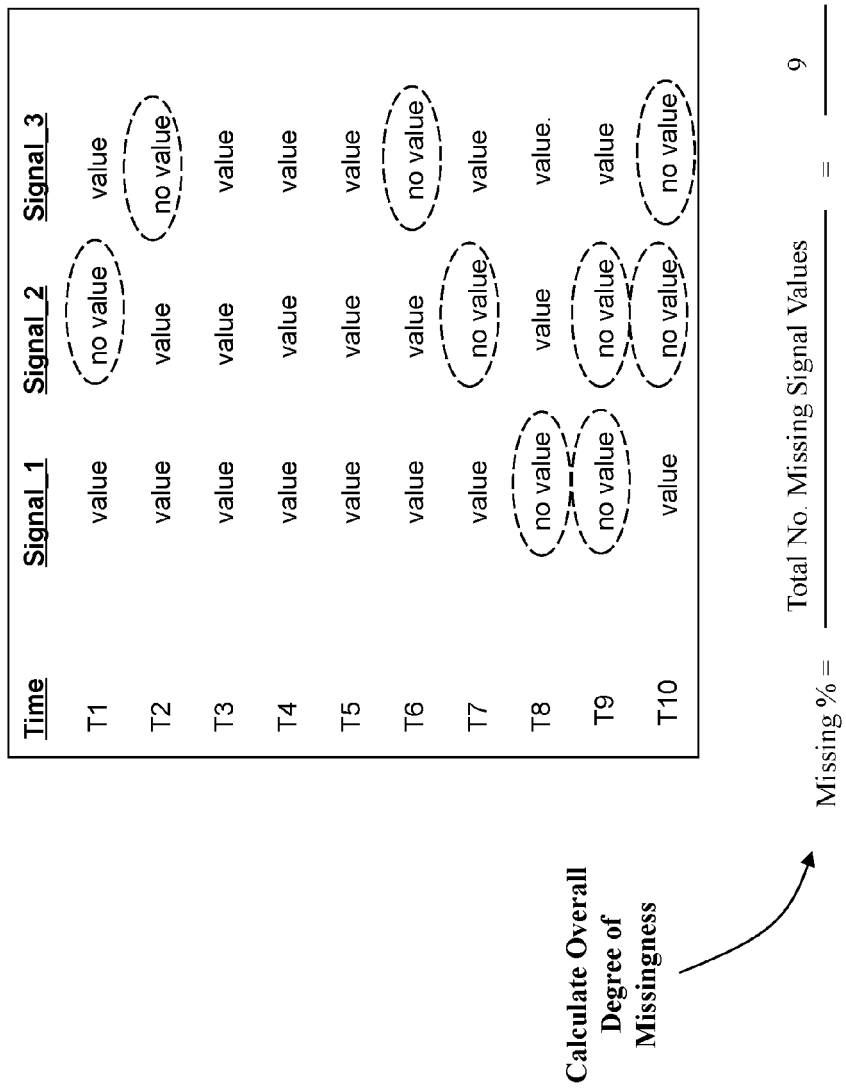

FIGS. 3A-C illustrate the first approach is to check for the overall degree to which data is missing from the expected dataset. FIG. 3A shows an example set of data having three different signals within the dataset, including signals S1, S2, and S3. Each of the signals are collected over a time period, e.g., over a time period from T1 through T10. All or some of the signals for which data is collected is supposed to be represented over this time period. In effect, a time series of data values would be collected for some or all of the signals. Data values may be collected for each of the signals over this time period, with the understanding that there may be missing signal values among the collected set of data.

As shown in FIG. 3B, this figure illustrates the process of identifying the missing signal values within the collected data. For the purposes of illustration, the term "value" is used in the figure to indicate that a signal value has been collected while the term "no value" indicates a missing signal value.

As shown in FIG. 3C, the overall degree of missingness for the data is then calculated by identifying the number of missing signal values relative to the total number of possible signal values within the data. Here, it can be seen that there are nine missing signal values (one missing value for time T1, one missing value for time T2, one for time T6, one for T7, one for T8, two for T9, and two for time T10). The total number of possible signal values is thirty (three possible values for each time T1-T10). Therefore, the total degree of missingness is 3 divided by 30, which works out to a 30% degree of missingness.

Figure 3D:
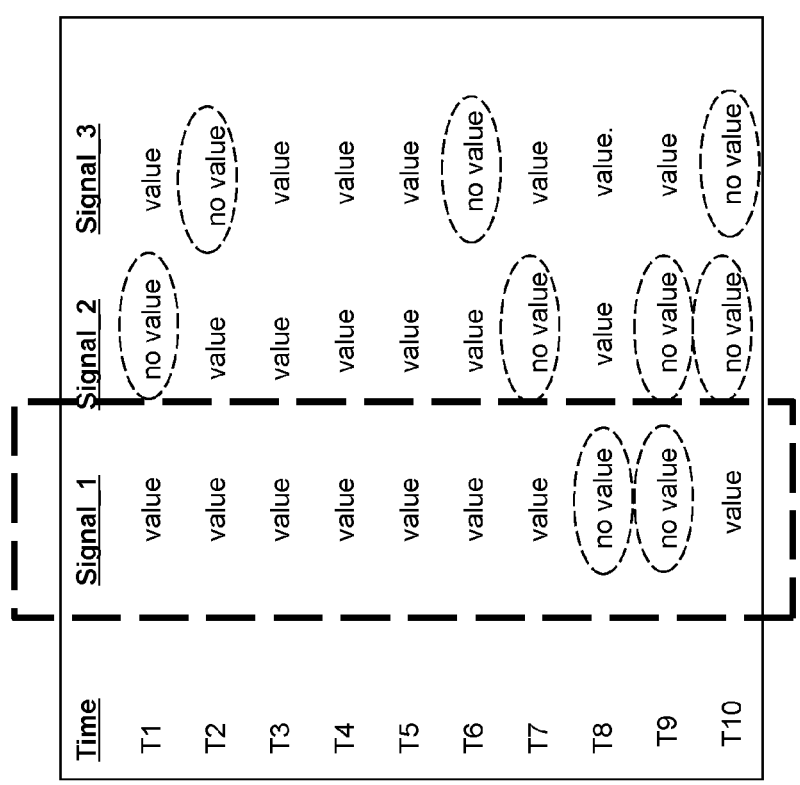
Figure 3E:
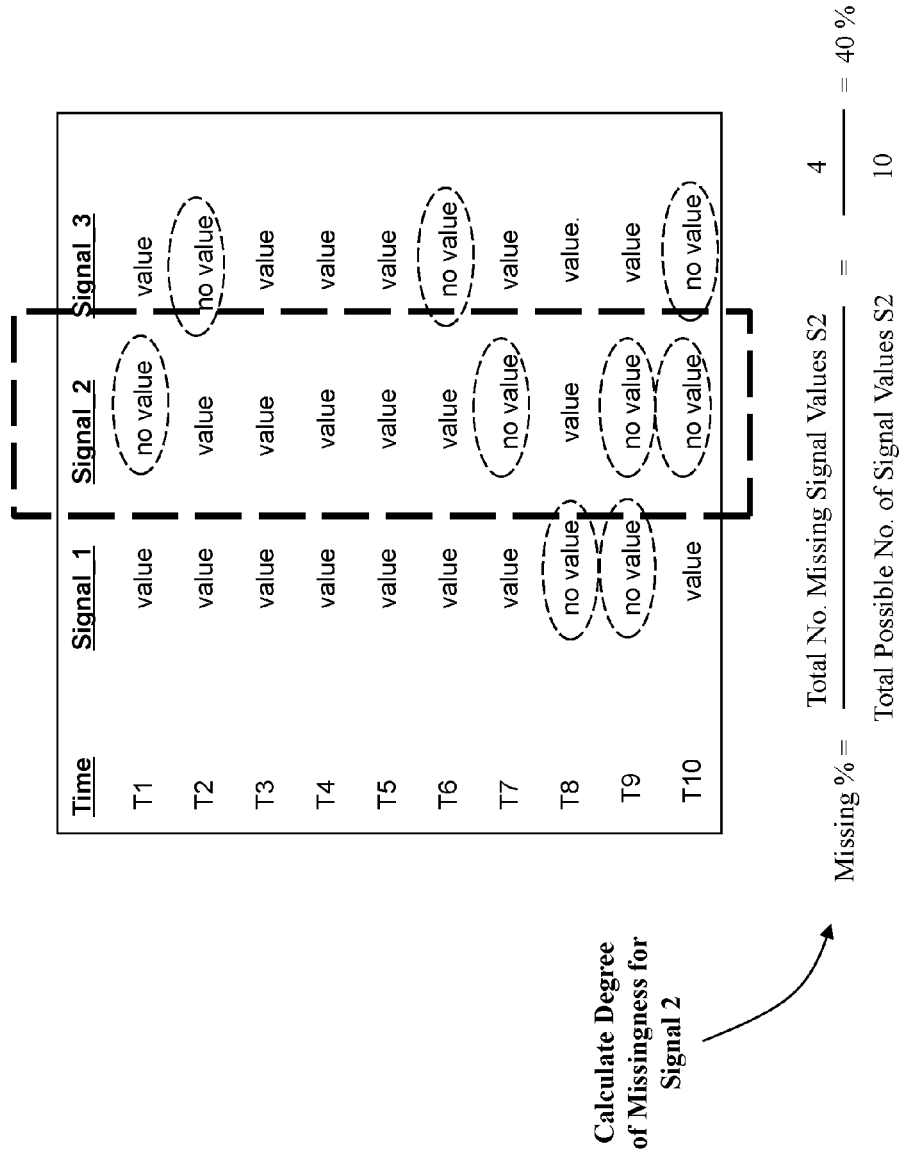
Figure 3F:
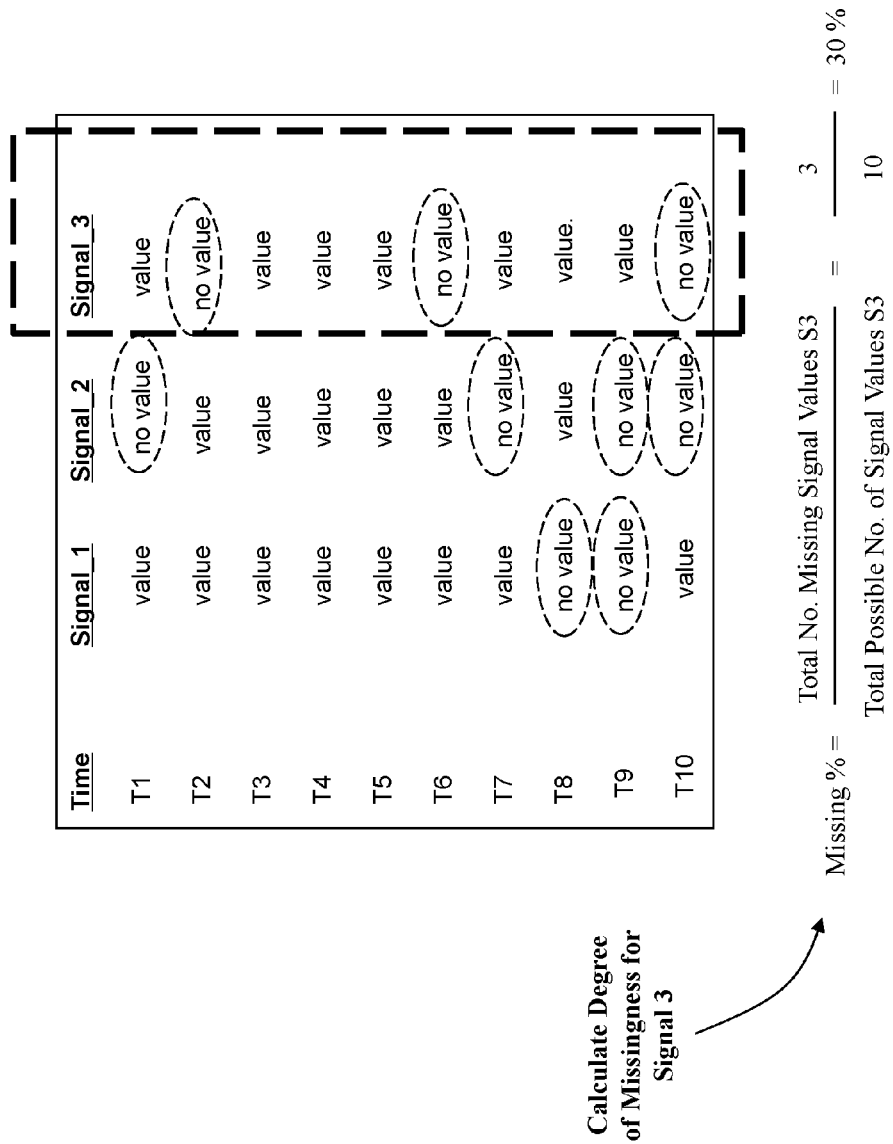

FIGS. 3D-F further illustrate the process for identifying the degree of missingness separately for each signal within the dataset. The degree of missingness for a specific signal is calculated by identifying the number of missing values for that signal relative to the total number of possible signal values.

FIG. 3D illustrates the calculation of the degree of missingness for signal S1. Here, it can be seen that there are two missing signal values for S1 (one missing value for time T8 and another missing value for time T9). The total number of possible signal values is ten (one possible value for each time T1-T10). Therefore, the total degree of missingness for signal S1 is 2 divided by 10, which works out to a 20% degree of missingness for signal S1.

FIG. 3E illustrates the determination of the degree of missingness for signal S2. For signal S2, there are four missing signal values (missing values for times T1, T7, T9, and T10). The total number of possible signal values is ten. Therefore, the total degree of missingness for signal S2 is 4 divided by 10, which works out to a 40% degree of missingness for signal S1. FIG. 3F similarly illustrates the determination of the degree of missingness for signal S3. Here, there are three missing signal values for S3 (missing values for times T2, T6, and T10). Therefore, the total degree of missingness for signal S3 is 3 divided by 10, which works out to a 30% degree of missingness.

Figure 4A:
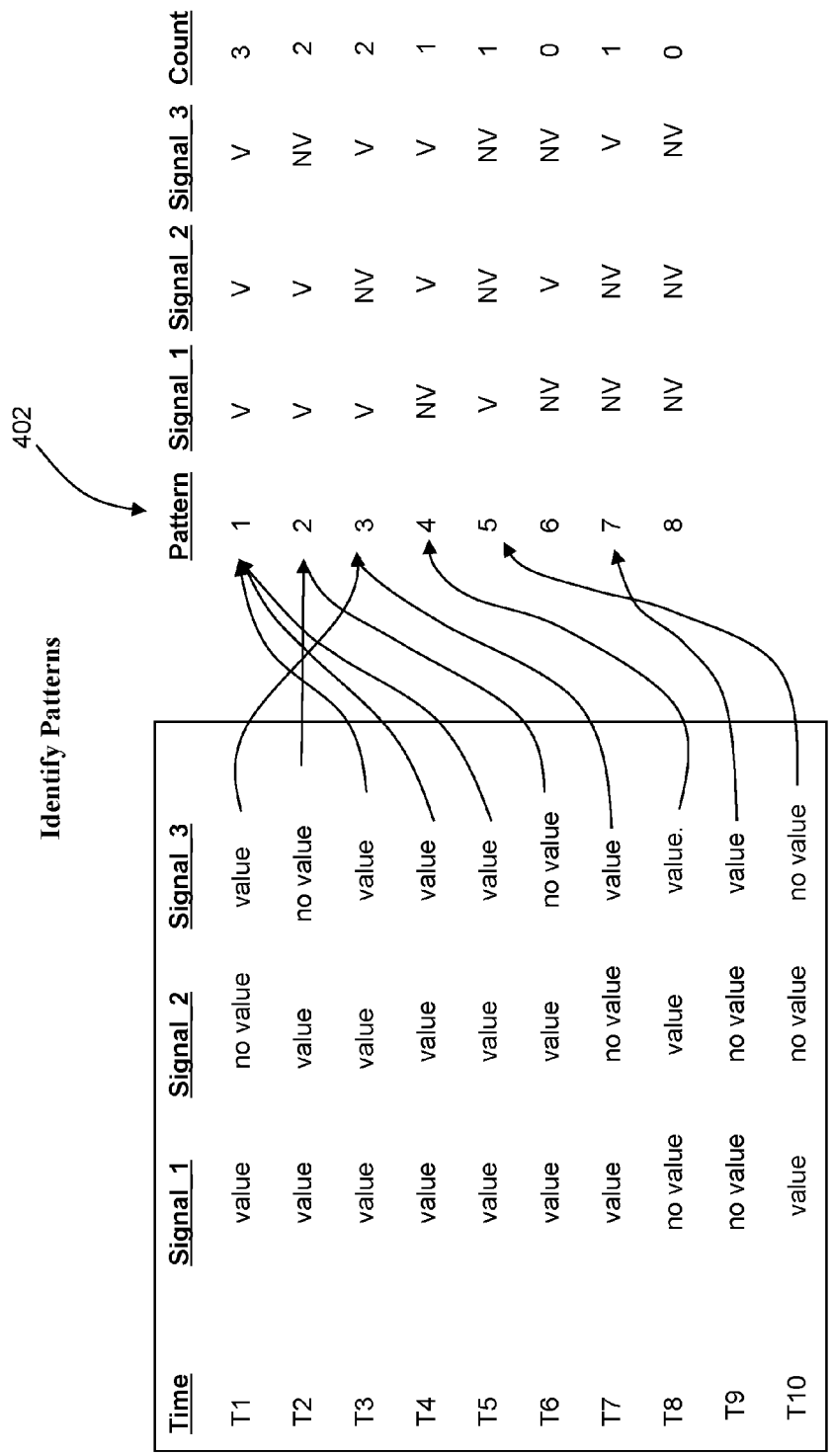

FIGS. 4A-B illustrates the third approach, which is to identify the level of missingness for each signal pattern within the dataset. This approach identifies each possible permutation that may exist for the signals for either being missing or not missing, and then determines the degree to which each such pattern appears in the data. Normally, there are $2^n$ patterns that exists for n number of signals. In the example of FIG. 4A, there are eight possible patterns for the signals since there are three signals for each line of data. Patterns 402 shows each of the eight possible patterns, where "NV" indicates a missing value, and "V" indicates a collected value for a signal. For example, pattern 1 has the "V" "V" "V" permutation, indicating that a value has been collected for each and every signal. In contrast, pattern 8 has the "NV" "NV" "NV" permutation, indicating that no value has been collected for each and every signal, which means that every signal value is missing for this permutation. Each of the other patterns lie somewhere in-between these two extremes with various permutations of missing values.

As shown in FIG. 4A, each line of data within the data (e.g., datapoints corresponding to times T1-10) are reviewed to identify correlation to one of the eight different patterns. For example, the lines of data collected for times T3, T4, and T5 corresponds to data where values have been collected for all three signals S1-S3, and there are no missing signal values. This matches pattern 1, and hence a count of "3" is identified for this pattern. For pattern 2, this corresponds to the pattern shown in the line of data for time T2, where value shave been collected for signals S1 and S2, but not collected for signal S3. The lines of data collected for times T1 and T7 corresponds to data where values have been collected for signals S1 and S3, but there is a missing value for signal S2. This matches pattern 3, and hence a count of "2" is identified for this pattern. Similarly, pattern 4 corresponds to the single line of data for time T8, pattern 5 corresponds to the single line of data for time T10, pattern 6 does not corresponds to any data, pattern 7 corresponds to the single line of data for time T9, and pattern 8 does not corresponds to any lines of data.

FIG. 4B shows the degree to which each pattern exists within the data. Here, it can be seen that pattern 1, which includes a full set of the signal data (with no missing signal values), corresponds to 30% of the data. Each of patterns 2 and 3 corresponds to 20% of the data, while patterns 4, 5, and 7 each correspond to 10% of the data. Patterns 6 and 8 did not appear within the data, and hence correspond to 0%.

Returning back to FIG. 2, the next step at 210 is to check whether there is a need to correct for any missing data. If the degree of missingness is less than a specific threshold, then there may not be any need to take any actions to impute missing values. Therefore, the process may proceed directly to 216 to use the collected data for model training/calibration.

On the other hand, if the missingness factor(s) indicate the need to correct for missing data, then the process proceeds to 212 to adaptively select a correction method. This action determines the specific correction approach based at least in part upon one or more of the degrees of missingness that were determined in step 208, where the treatment approach to missing data adapts to the degree of missingness exhibited by the data. The general idea is that the level of missing data determines the level of aggressiveness in which there is a need to user external factors to determine the missing data, where lower levels of missing data relies more upon internal sources while higher levels of missing data may rely more upon external sources. This approach balances the desire to preserve as much as possible the integrity of the existing data, while still being able to act to correct missing data even in cases of extreme sparseness or severe levels of missing data.

Various imputation methods can be implemented and assembled, in alternating orders, for multiple individual sequences, where each order/sequence can be tailored appropriately to deal with the severity degree of the missingness in observed data. In some embodiments, imputation methods may include one or all of the following: (1) Imputation using Expectation Maximization (EM) techniques where data is assumed to have Multivariate Gaussian distributions; (2) Imputation using hybrid form of the Expectation Maximization methods where severely missing data is acquired from an external source to perform the Expectation Maximization method; (3) Imputation using predicted values produced by predictive models; and (4) Imputation using full simulation when majority of data is severely missing.

For low to moderate missingness (e.g., below 20% of missingness ratio), the Expectation Maximization (212a) approach can be taken to handle the missing data issues. This approach makes the assumption that missing data is Gaussian, where Expectation Maximization (EM) processing is employed to estimate theta and sigma model parameters relying on information presented by the observed data only. Once the model parameters have converged satisfactory, then the approach uses, for example, Cholesky decomposition to impute any missing data conditioned on the observed part of the data.

As the missingness ratio increases, the Expectation Maximization (EM) approach may not converge and/or some signals might be totally absent. At this level, the Hybrid EM (212b) approach can be taken to re-assemble the signals in subgroups and repeats the EM process to see if it can succeed on any subgroup of the original signals—using only the observed data. This approach "patches" any missing components of the resulting covariance matrix with realistic and reliable values obtained from external resources. This is a good approach to take when overall levels of missingness are not too high, but there are individual signals that may have relatively high levels of sparseness.

The approach to impute with predictive values (212c) is an approach where predicted values produced by a predictive model may be employed to impute data values. If the previously described approach do not converge to a valid set of data, then this approach can be used to produce imputations reflecting the clustered states of the utilized models.

Simulation (212d) may be employed when missing data levels are extremely severe, and none of the preceding techniques are able to produce usable data. A simulator created from observations of actual systems may be employed to perform the simulation process. This approach can be used to generate a data distribution that is empirically constructed for actual data.

To allow for the above approaches to fall back to some necessary information readied from a reliable data repository, the data repository can be constructed with this purpose in mind, beforehand. An offline statistical analyzer tool can be employed to fine tune a statistical model, iteratively, for any group of signals as newer data is scanned. By feeding the tool a large amount of data it can produce a refined and generalizable model that is used to assist the imputation process as described above.

Some or all of the above approaches may be implemented as R-based methods that scan observation data, e.g. collected during tests, and compute descriptive statistics for each signal used in the machine learning product to generate robust covariance matrixes and/or to aid simulations.

Therefore, this adaptive approach addresses the problem where data for many signals collected from clustered databases were found to be sparse to varying degrees. This approach addresses these issues by using a gradient solution that is attentive to imputation needs at each of several missingness levels. The solutions provided by this method facilitates wider deployment and acceptance of machine learning products. In addition, this multilevel approach enables treating data missingness adequately at any of its severity levels while utilizing, as much as possible, the actual observed data.

At 214, a determination is made whether the selected imputation method has produced acceptable data. If so, then the imputed data is used at 216 to train/calibrate a predictive model. If the data is not acceptable, then a determination is made whether to retry one or more of the imputation methods. If the decision is made to take an alternate approach, then an alternate imputation approach is selected at 218, and the process proceeds back to 212 to apply the selected imputation method. In some cases, the data may not be acceptable, but a decision is made not to re-attempt any of the imputation methods. If so, then the process proceeds to an error state at 220.

Figure 5:
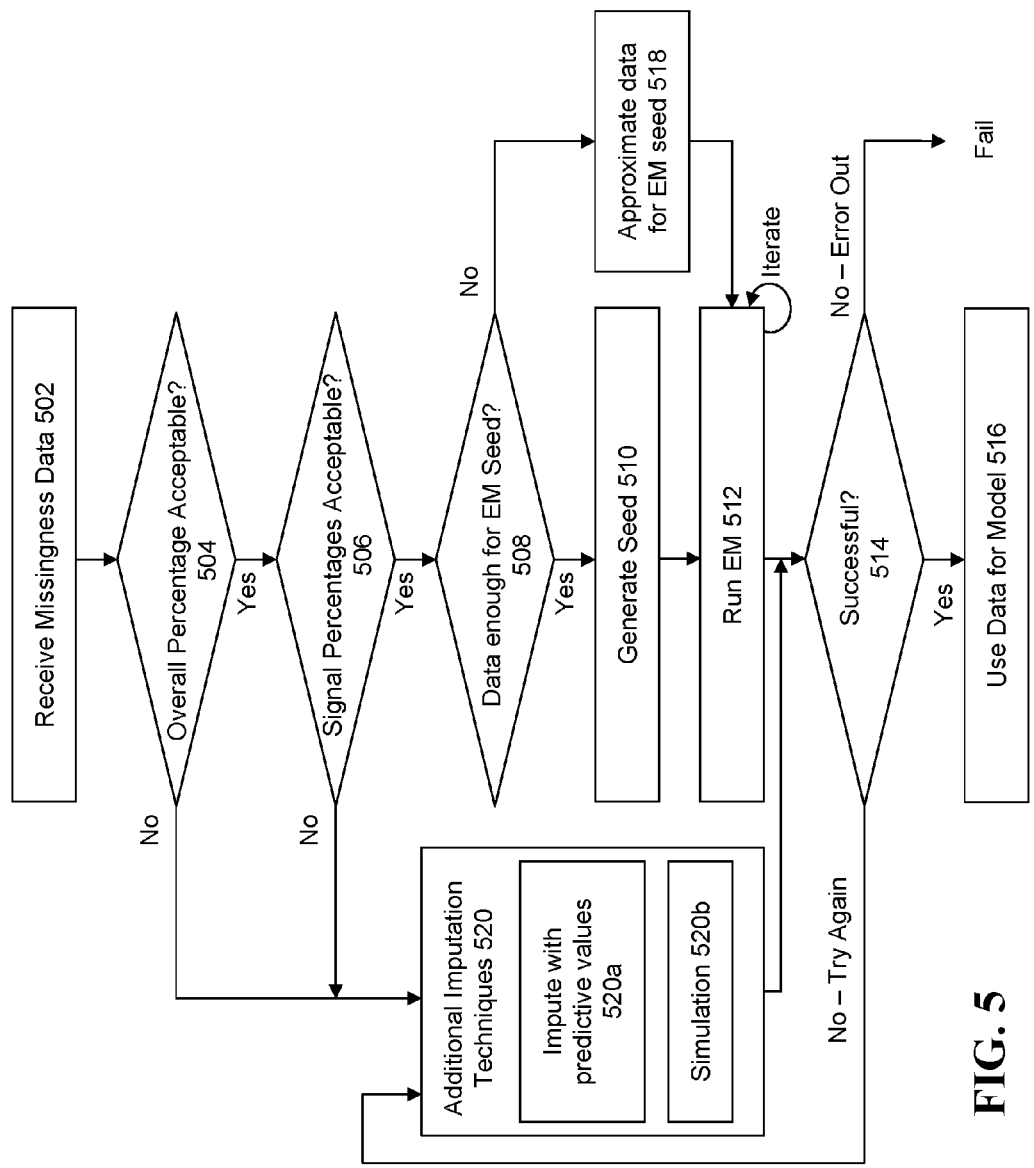
FIG. 5 shows a flowchart generating training data on a first target to be used by a second target.

FIG. 5 shows a flowchart of an approach to adaptively select and apply an imputation method according to some embodiments of the invention. The general flow of this process is to first try to apply EM if the level of missing data is low enough, with other imputation methods successively applied as necessary if EM is either not appropriate or does not work. Therefore, at 502, an initial action is to obtain and review information regarding the various measures of missingness that were previously calculated (see step 208 of FIG. 2). This information includes, for example, a first measure that identifies the overall degree to which data is missing from the expected dataset, a second measure that identifies the degree of missingness for each signal within the dataset, and a third measure that tracks the level of missingness for each signal pattern within the dataset.

At 504, a determination is made whether the overall degree to which data is missing from the dataset is sufficient to perform EM. If there is too much missing data from the overall dataset, then it is likely that the EM approach will not be successful since convergence may not be obtainable and/or obtainable within a reasonable amount of time and effort. Therefore, one or more thresholds may be established to statistically identify the amount of missing data that would create high likelihoods of failure. If the amount of missing data exceeds that designated threshold, then the process proceeds to 520 to select an alternate non-EM approach to address the missing data. If, however, the amount of missing data is less than the designated threshold, then the process proceeds to 506 to perform the same type of determination for each separate signal, to check whether the degree to which data is missing from the dataset for each signal is sufficient to perform EM. As before, one or more thresholds may be established for each signal, and the degree of missingness for each signal is compared to the designated threshold(s). If the amount of missing data for the signals exceed that designated threshold(s), then the process proceeds to 520 to select an alternate non-EM imputation approach. However, if the amount of missing data of the signals is less than the designated threshold(s), then the process proceeds to perform EM.

At 508, a determination is made whether the dataset includes sufficient data for an EM seed. When processing EM, the 'seed" or "seed points" relate to the data that is used for the input space to initialize the generation of values for processing. In some embodiments, the more "complete" datapoints are recommended to be used as the EM seeds, where if there are any lines of data that are entirely complete, e.g., without any missing signal values, then these complete lines of data can be employed as the EM seed. Therefore, the action of step 508 is to determine whether there are sufficient lines of complete datapoints (or possibly near-complete datapoints having very low amounts missing data) that are sufficient to act as the EM seed. This determination can be made, for example, by reviewing the data identified in FIG. 4B, and checking the percentage of datapoints that correspond to the complete pattern (pattern 1) where there are no items of missing signal data. One or more thresholds may be established to statistically identify the number of complete datapoints would be necessary for EM seeding, which may vary depending upon the numbers of signals in the dataset of interest. For example, in some embodiments, if as little as 6% of the dataset corresponds to a complete datapoint, then there is sufficient data for the EM seed. Even if there are not sufficient lines of complete, data, EM may still be applied in some embodiments if there is a sufficient percentage of mostly-complete data, e.g., where there is a sufficient number of lines of data that only have one missing signal value.

Once the EM seed has been generated, the next step at 512 is to actually run the EM process. EM is a statistical approach to iteratively identify the maximum likelihood of a set of parameters in a statistical model. In particular, this iterative approach uses other variables/parameters to impute a value (expectation) and then checks whether the imputed value is the most likely value (maximization). Pertinent to the present application, there is an assumption that the signal data within the dataset is Gaussian in nature, and therefore when the actual complete data is used as a seed, then an iterative process is applied to identify the missing data and to check their "fit" with the actual data. Since the datasets being processed include multiple Gaussian signals, the process is attempting to fit an n-dimensional Gaussian curve to obtain convergence. In the present use case for EM, the complete data X is the observed data Y plus some missing data Z, so that X=(Y, Z), where EM is applied for the missing data to a Gaussian mixture model (GMM). While the present disclosure illustratively describes EM with respect to a Gaussian model, it is noted that other approaches may also be taken (such as fitting a Markov model), and thus the inventive concepts disclosed herein are not to be limited to specific statistical models unless explicitly claimed as such.

The EM process specifies the complete data X for the problem of fitting a GMM using EM clustering, where points are observed that are generated relative to k Gaussians, and the process identifies the means and covariances of the Gaussians, and the probability (weight) that a point comes from each of the Gaussians. To facilitate the estimations, the process may probabilistically assign each of the observed points to each of the generating Gaussians. The process starts with parameters for the full data, and once those are obtained, then they are injected into the EM matrix with the rest coming from the determined distributions (e.g., inject actual value and then fill in for the missing values). The, the process will then compute new values, which are compared to previously imputed values, and the maximal fit values are kept. This process iteratively repeats until convergence is reached.

This EM approach to obtain imputations is very useful because it allows the system to preserve the relationship with other actual/existing parameters. It is noted, however, that some embodiments may replace the EM portion of the flow with alternate imputation methods, such as Maximum Likelihood Estimation (MLE) approach or the Multiple Imputation approach.

If the determination of 508 is that the collected data is too sparse or incomplete for the EM seed, then the process, at 518, will approximate the EM seed data from another data source. The data source may be, for example, collected data from an earlier observation of the same system that is currently under monitoring. As an alternative, the data source may be an external system that is known to have similar characteristics to the system currently being monitored, such as for example, where other instances, nodes, databases, and/or clusters have similar architectural specifications (e.g., in terms of hardware and/or software), as well as or in addition to comparable workloads to the system being monitored.

According to some embodiments, the process does not simply take the raw data for the other system to replace the missing signal values. Instead, the process will form a covariance matrix, which is a matrix that statistically describes how the signals interrelate with one another in terms of their values. The missing signal values correlate to opaque portions of the matrix, and re-positioning is performed to see how the various signals relate to each other from each repositioning. Therefore, the process will identify the missing signal(s) that need to be imputed. Next, a search is made of the data repository for the signals of interest. The covariance of the signal in relation to every other signal in the dataset is obtained. For example, as shown in FIG. 4A, if S1 and S2 are present but S3 is missing from a given datapoint, then a first data element pertains to how S1 relates to S3, a second data element pertains to how S2 relates to S3, and a third data element pertains to how S3 relates to S3 (itself). These values are fed into the covariance matrix of the dataset, and the process then proceeds to complete the EM process at 512 (as described above).

A determination can be made at 514 whether the selected imputation approach was successful. The imputation process may suffer a "hard" failure, where step 514 is taken to check the fit of imputed solution, to determine whether successful convergence has been achieved. The process may also check for "soft" failures, where specified limits are reached for the processing activity even if convergence may be achievable. For example, a designated time limit, iteration number limit, and/or resource amount consumption limit can be established to stop the EM processing if a successful solution has not been identified by that limit period. This prevents the EM processing from consuming unreasonably amounts of system resources/time in excessive iterations while not reaching a solution. If successful, then at 516, the data is employed for model training/calibration.

If not successful, and there is a desire to try imputation again, then the process proceeds to 520 to attempt an alternate imputation technique. For example, at 520a, an approach can be taken to impute with predictive values generated by a predictive model. The predictive model may be the old model that was created by a previous cycle of model training. Such predictive models are often able to generate predicted values for signal data under observed conditions. Therefore, this imputation method takes the data that had been collected for the system under observation, and runs that data through the previously generated prediction model to generate predicted signal values for the system. The predicted signal values for any missing signal data are then used to fill any gaps in the collected data. As such, this approach can be used to produce imputations reflecting the clustered states of the utilized models.

Alternatively, the simulation approach of 520b may be employed when missing data levels are extremely severe, where the severe nature of the missing data may be either horizontal (e.g., across a line of data), or vertical (e.g., sparseness within one or more specific signals). This approach is particularly applicable if the missing degree is too severe for the patching mechanism to work successfully, and where the system can resolve to classical simulation using closely related models already constructed from similar data for this purpose. This approach can be used to generate a data distribution that is empirically constructed for actual data.

Therefore, what has been described is an adaptive approach that can address the problem where data for many signals collected from clustered databases were found to be sparse to varying degrees. This approach addresses these issues by using a gradient solution that is attentive to imputation needs at each of several missingness levels. The solutions provided by this method facilitates wider deployment and acceptance of machine learning products. In addition, this multilevel approach enables treating data missingness adequately at any of its severity levels while utilizing, as much as possible, the actual observed data. The multi-level adaptive approach has the capacity to handle sparse or largely missing data, thus guaranteeing the continuous operations of machine learning model recalibration.

The inventive techniques can be applied to perform proactive health prognostics for a clustered computing system using supervised learning techniques, which are applied to implement a model-driven, pattern recognition and automatic problem diagnostic engine to accomplish its monitoring tasks for the clustered system.

According to some embodiments, the invention may be implemented in a cluster health advisor system (which may be referred to herein as a "Cluster Health Advisor" or "CHA") that employs supervised learning techniques to provide proactive health prognostics. The health advising system performs online monitoring for the health status of complex systems database instances and hosts systems in real time. This system leverages an integrated battery of advanced, model-driven, pattern recognition and automatic problem diagnostic engines to accomplish its monitoring tasks.

Figure 6:
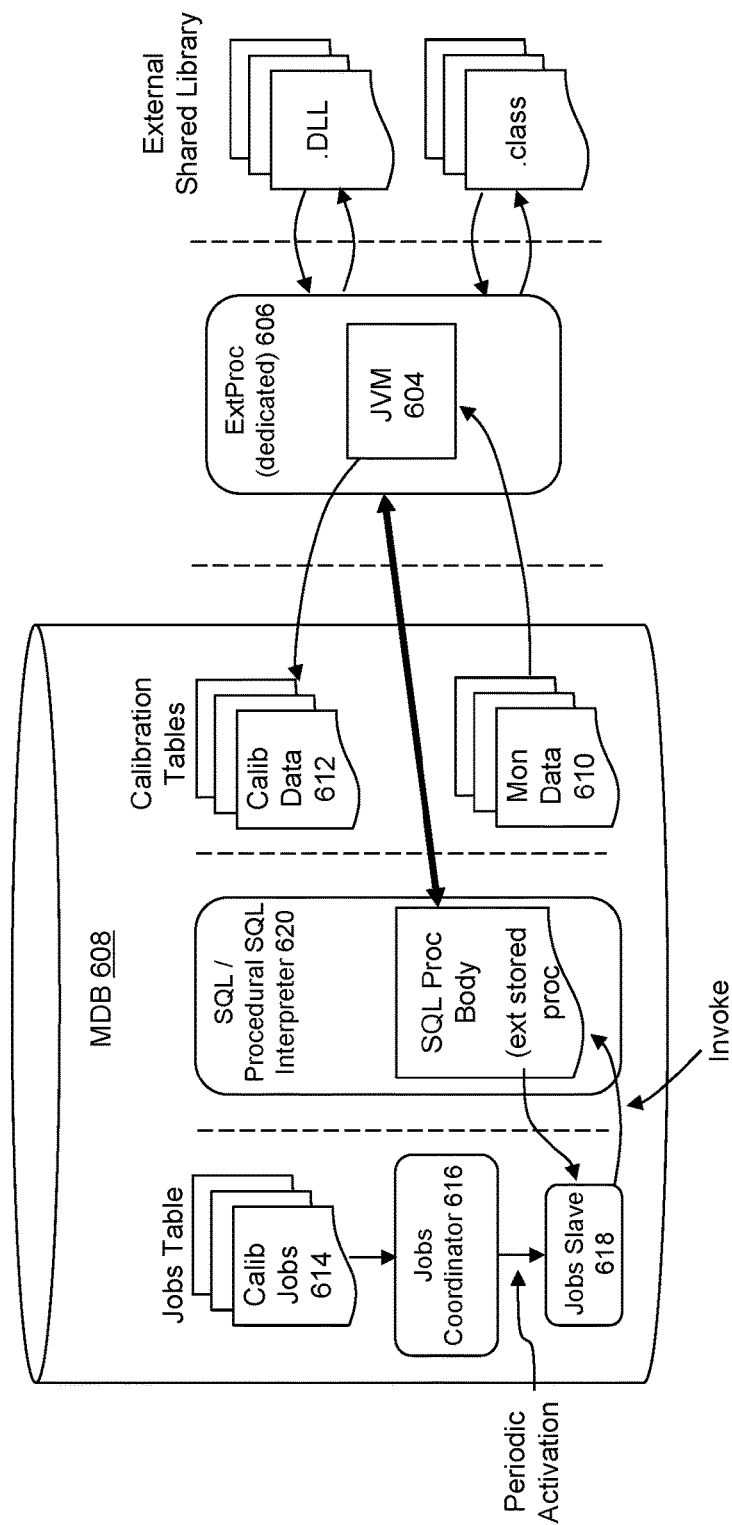
FIG. 6 illustrates the major processes in the health advising system in one embodiment.

FIG. 6 illustrates the major components in the health advising system in one embodiment, and their overall interactions responsible for the treatment of training data and the generation of predictive models. Core functionality is implemented by a set of Java classes installed on every host where the Management Datastore (MDB) 608 is expected to run. These classes execute inside a java virtual machine (JVM) 604 that is contained within a dedicated external process (EXTPROC) agent process 606 (e.g., the JVM runs in same machine as the MDB 608 but is external to the MDB 608), thus allowing for more flexibility in terms of what JVMs to choose from, e.g., to address hot spots for the JVMs. Additionally, the execution is isolated from the MDB 608, and hence does not adversely impact the performance or reliability characteristics of the MDB 608. The EXTPROC 606 will be spawned directly by the database server and it will last as long as needed by a job to scan the system.

The monitoring data 610 is collected and stored in the MDB 608. The collected data 610 may be subject to various factors that cause values to often reach outlier levels. A preprocessing step is thus employed to effectively cleanse the training data from all of these anomalies and outliers before it can be used for model training. In some embodiments, the training data is treated in an automatic way to ready it for model training with minimal user intervention. While this process is typically conducted in the industry by manual means and exclusively by experts in statistics and machine learning, the above-described embodiments provide approaches to implement this even where some intended users may lack such expertise.

Health monitoring is performed for critical subsystems of the clustered systems, including for example, the database instance and the host system. It is noted that additional cluster systems may be supported as well. The system is architected using software components that work together in tandem to determine and track the health status of the monitored system, where the components periodically sample wide variety of key measurements from the monitored system, which will then analyze the stream of observed data in reference to established base models. Anomalous readings (referred to herein as faults) using these approach in a rapid way with a high degree of confidence. Once faults are detected, automatic probabilistic-based problem diagnosis can be invoked, where the system infers the type of the underlying problems and their root causes from the set of faulty readings. Users will be advised with a set of recommended correction actions to alleviate the reported problem(s).

One important task is the proper selection and assignment of predictive-based models to targets. To foster robust analysis, selection is made of a model that can faithfully captures the target's operating modality expected during the monitoring period. Several models can be created for targets that could operate exclusively in significantly different operating modes. Model generation is facilitated by a training process that is sensitive to training data. Once users identify a significant new operating modality of their target, they can generate a new model to be associated with monitoring during this modality. Training data 612 is gathered (e.g., automatically gathered and sorted as per time dimension) during target monitoring. Users are guided to identify and select related and clean training data set for a desirable period when the target was operating within a unique mode.

The evaluation and preparation logic include the periodic scanning of target monitoring data (stored in system's datastore) and their corresponding generated output (e.g. any detected faults and diagnosed problems held in tables of the datastore), highlighting various potential anomalies and outliers that data may contain, and analyzing the data (using robust statistical methods) for its goodness to serve as input to new system's model training. Techniques such as imputation could be applied when necessary to enhance the fidelity of collected data and to improve the quality of new model generation. These specialized components are periodically invoked and driven by a scheduler as a scheduled job at predefined intervals. The high-quality training data produced at the end of each run cycle and the newly calibrated models are added to the datastore. One or more jobs 614 can be accessed by a job coordinator 616, which periodically activates one or more job slaves 618 to perform the training/processing jobs. An interpreter 620 may be used to access a set of procedures, e.g., PL/SQL external procedures, having one or more shared libraries and/or java classes. Their purpose is to collect, analyze, evaluate, cleanse, and transform the data observed during target online monitoring and prepare it into high quality training data. The resulting data is sufficiently adequate for new target predictive-model training.

An additional embodiment pertain to a service-oriented method for cleansing training data used for recalibrating predictive models.

Outliers are known to potentially exist in raw datasets intended for retraining of predictive models in many fields. In particular, sensory data collected from clustered databases may be subject to various sampling and calculation errors and, if left untreated, these errors cause significant harmful variance errors in the generated models. Existing solutions typically require trained statistician experts with domain experience to, mostly manually, validate each individual data point in the dataset and to interpret the mathematical outcomes of some domain-specific statistical analysis tools for validation. This might hamper the widespread adoption of machine learning solutions.

One major improvement provided by some embodiments is the ability for ordinary database DBA's and users, with little or no mathematical and statistical background, to effectively administer the preprocessing of training data, and to remove specious outliers. Typically, this operation requires an expert with statistical and mathematical backgrounds in addition to domain experience. Rather than depending on intrinsic numerical characteristics of training data as the main arbiter for validations, which is the norm in the industry, this method introduces key service performance metrics to adjudicate on the permissible sequences of data to accept it for retraining purposes.

It is noted that a datapoint collected from the monitored target may include tens or even hundreds of signals values that together describe the holistic current state of the target (a target could be a database instance, or its host). In some embodiments, included as part of these signals are additional, critical, values of key performance indicators with corresponding timestamp (examples of such KPI's cpu utilization, database time per user call . . . etc) that end users are familiar with and accustomed with to report the quality of the fundamental services provided by the target systems. An interface is provided to allow users to express the desired ranges of the service quality their business would normally accept.

For example, a CPU utilization range may be chosen to be within 15% and 35%, similarly the DB time per user call could be between 7 msec and 25 msec. The system then calculates the intersection of the set of user-defined KPI ranges (i.e. logical AND) considered together and apply the computed result as a preliminary filter against the whole input dataset. The filtering is performed such that only the datapoints that satisfy the filter would be admitted as candidates for model recalibration, with all others being ignored. Since any one KPI is in fact an aggregation of some QoS aspect of the target, by this definition, none of the individual signals drawn from the same system is expected to assume an anomalous value if the aggregate itself happen to fall within an acceptable range.

Therefore, through the use of declarative and familiar service performance metrics, this approach allows ordinary database users to carry on the tasks of preprocessing training data, a task that is necessary for the successful retraining of machine learning based predictive models in the field. This method, in essence, enables the wide deployment of machine learning products by eliminating the need for highly specific and advanced experience to handle this important task effectively in the field. An example approach to selection of training data for predictive models is described in co-pending U.S. application Ser. No. 15/707,417, filed on even date herewith, which is hereby incorporated by reference in its entirety.

An additional embodiment pertain to a method of using system detrimental events to remove outliers from data used in the re-training of predictive models.

Outliers and other anomalous data have the potential to infiltrate training datasets collected from target systems during monitoring. When the monitored system undergoes some detrimental event, the sensory data collected around this period tends to exhibit numerical values beyond their normally acceptable ranges. For example, in clustered database systems, during scheduled procedures like starting and shutting instances or during nonscheduled procedures like node failover events, monitored systems can be stressed momentarily beyond acceptable and normal limits. These extreme values can be harmful if used to retrain predictive models.

Existing solutions typically require trained statisticians or data scientists with domain experience to manually validate each individual data point in the training dataset, and to interpret the mathematical outcomes of some domain-specific statistical tool for validation. This requirement may hamper the widespread adoption of machine learning solutions. Therefore, one main hurdle in the path for autonomous health monitoring products is the challenge to reduce the dependency on human expertise to interpret or administer machine learning model based solutions.

In some embodiments, purging training data from unwanted anomalous patterns is performed in the generation of adequate models to guide this monitoring. The present disclosure provides a framework to register and track operational and environmental events that are deemed to have detrimental impacts on the monitored system. When any of these events are detected, a timestamp will be produced and used to purge any data samples generated near its vicinity.

In particular, when the monitored systems (targets) are operating under some hazardous conditions, then some of its collected signals are expected to show outlier values. A hazardous condition could be any event that exerts unpropitious circumstances upon the monitored target, and typically manifest itself as unjustifiable extreme magnitudes of the collected metrics. For example, when a node is evicted from the cluster and its existing workload is being transitioned over to the surviving nodes, a temporary and unusual strain occurs and needs to be dealt with by the surviving nodes. For the duration of such events, many of the signals observed values, sampled from the impacted targets, could assume extreme ranges that would adversely impact the re-training process and render the resulting new models invalid.

In implementing the present embodiment, a set of signals is identified with direct correlation to various detrimental events. A filter takes a declaration as input to indicate the name of signals, and their particular ranges, that are indicative of detrimental events. The filter would then scan all candidate data sets looking for any datapoint that might be a manifestation of any of the given detrimental events. If found, the filter will then delete the datapoint as well as a prescribed number of preceding as well as antecedent datapoints. This approach therefore cleanses the training data from any pre or post perturbations that might accompany the detrimental event.

The embodiment of the invention therefore purges the training data of any undesired anomalous patterns to generate the models. As such, this approach provides a significant improvement towards the automation of machine learning model re-training. An example approach to using system detrimental events to remove outliers from data used in the re-training of predictive models is described in co-pending U.S. application Ser. No. 15/707,454, filed on even date herewith, which is hereby incorporated by reference in its entirety.

Yet another embodiment pertains to an analytical approach to evaluate the quality of datasets for retraining predictive models of clustered databases.

For supervised training of predictive models, the quality of the training data (e.g. in terms of sufficient count of distinct patterns that correctly capture the steady states aspects of target systems) is important for good model retraining. Existing solutions expect human experts to perform the task of validating the quality of the training datasets, mostly in an ad hoc fashion. However, such expert resources cannot be assumed to be available in the field all the time, and this lack of availability might hamper the successful deployment and acceptance of supervised machine learning solutions. Additionally, without some sort of established reference serving as a baseline, numerical analysis methods on their own may not be able to determine if a dataset captures enough normal facets of the target system.

Some embodiments provide a method and system for the introduction of a finite set of analytical terms that can sufficiently describe the information embodied by the patterns found in arbitrarily large training datasets. This set of analytical terms can then be used as the bases for comparisons and used to draw important conclusions about the quality and suitability of the corresponding datasets to retrain predictive models. This approach helps to systematize the preprocessing phase and simplifies model verification.

The approach systematizes a set of key analytical terms, to be derived for any arbitrary large training dataset (e.g. from monitored clustered databases), and then compares the sets themselves to effectively establish similarity scores among their corresponding datasets. This method maps a dataset to its primary clusters and then analyzes the clusters in terms of their count, mutual separation distances, and the overall multidimensional volume they occupy. An automatic evaluation of the suitability of training datasets for model retraining purposes is determined by appraising their own similarity scores to those of established or default datasets.

Therefore, the embodiment provides an approach that simplifies, systematizes, and abridges the model verification processes. It can be utilized by expert users or executed directly when human assistance is limited. This would improve the successful acceptance and market penetration of supervised machine leaning-based solutions.

An additional embodiment pertains to an approach for implementing predictive model selection based on user-defined criteria in clustered databases.

As the compute conditions of target systems may undergo significant transformations over time (e.g., due to changes in workload, configurations, etc.), there exists a need for new models to be plugged in that are more adequate for the new conditions. This raises the issue of what model the user should choose and how to search for it. Current industry solutions tend to require entirely new training in order to satisfy any new conditions. This is, of course, a costly operation and grossly inefficient since it would discard previous model development rather than leverage it.

In particular, when the operating conditions of the monitored system (target) departs away from its current operating state permanently and by a significant magnitude, then the already used models may become inadequate for the new operating state, the user is recommended to update the models and use another and more relevant models.

According to some embodiments, the inventive approach identifies critical operational parameters of target systems and tags newly developed models with these parameters (e.g., values demonstrated by the target systems during periods of training data), thus allowing all successful models to be preserved for future use. The method translates model search and selection exercises into a feature or tag matching problem. Given the new parameters of the target system, this method would then search the library of existing models for the one with the most matching tags.

Rather than initiating a whole re-training process (as it is the typical case in the industry) the user could select from the model library one model that is quite most adequate for the new operating state.

The selection process works as follows: The KPI list and their ranges for generating new models are saved and passed on as tags (features) attached to the new models. The selection process is transformed into a matching problem, e.g., given the new values of desired KPI ranges, workload class and intensity, compute resource configuration find the model with best matching features. The search is heuristic and the outcome list of models is ordered according to their matching score. The user may pick the model with the highest score, or decide to initiate a whole new re-training process if the scores are found to be low.

Therefore, the present approach is able to preserve successfully developed models and leverage them for future use. This offers not only increased operational efficiency, but also helps to reduce down time of machine learning products in the field.

Another embodiment pertains to an approach to implement context-aware prognoses in the health analysis of clustered databases.

Health monitoring solutions in the industry strive to identify the particular component that is the source of their diagnosed faults. In many cases, conventional solutions build some ad hoc logic that are notorious for having low-grade accuracy even under slight behavior drifts in the monitored target. Additionally, they may not cope gracefully well with the prohibitively large amount of input data of today's environment. Solutions exploiting machine learning and predictive models progress towards a finite set of outcomes and they too are not prepared to establish contextual references for any of their diagnoses output.

Some embodiments provide a new context-aware, multi-step prognoses to machine learning-based health monitors and does so by supplementing model-based operations with parallel streams of live detailed data obtained from various parts of the managed system. Streams with usual data content are filtered out and only those with extreme data are allowed to undergo further analysis—signifying the parts that are contributing the most to the undergoing fault prognoses. This filtration helps cope with the expectedly vast volume of incoming data. The streams are further prioritized based on drift and severity of their data content, eventually declaring one, or a few parts, that are highly suspect of being the original source of the diagnosed fault. Context-aware corrective actions can then be derived using a state transition table.

This approach harnesses streams of detailed observations data collected from the monitored target to create context, in parallel to regular model operations, for the model diagnostics and prognostics results. The method supplements model-based operations with parallel streams of live detailed traffic obtained from various components of the monitored system. Streams with usual data content are filtered out and only those with extreme data are allowed to undergo further analysis—signifying the parts that are contributing the most to the undergoing fault prognoses. This filtration helps cope with the expectedly vast volume of incoming data. The streams are further prioritized based on drift and severity of their data content, eventually declaring one, or a few parts, that are highly suspect of being the original source of the diagnosed fault. Context-aware corrective actions can then be derived using a state transition table.

Therefore, the ability of the present embodiment to pinpoint the part, or parts, from where the diagnosed fault first originated is a greatly appreciated feature in any machine learning-based health monitor and, together with a reasonable corrective action, it will enable users to shorten the time to recovery significantly. This will translate to higher acceptance and greater adoption of machine learning solutions. An example approach to implement context-aware prognoses is described in co-pending U.S. application Ser. No. 15707536, filed on even date herewith, which is hereby incorporated by reference in its entirety.

Yet another embodiment pertains to an approach to perform pipelining multiple of predictive mini-models together to improve diagnoses and prognoses quality in clustered databases.

To monitor the health of a software component using machine learning techniques, a model that captures the main operational aspects of the component is typically constructed to steer the health diagnosis and prognosis process. Typical modeling approaches tend to construct a dedicated model for each individual software component with great emphasis on the intrinsic features of the target component itself. Important clues from the surrounding environment and other interacting components are mostly left untapped. As such, the prognoses performed in such a compartmentalized fashion with isolated models tend to lack holistic awareness and may produce low-grade outcomes.

According to some embodiments, the present invention constructs composite models that are made of an assemblage of mini-models reflecting on the environment and other external components surrounding the target. The diagnoses and prognoses process would then leverage this holistic awareness and produce outcomes with higher accuracy.

Consider as an example the operations of a database instance. While its intrinsic design and algorithms are expected to constitute the main factors which impact its operational behavior, the state of the operating system that hosts the instance would also have direct impacts on it as well. Such inter-component impact is not thoroughly captured by traditional machine learning model construction techniques, where the training data used in the training of new predictive models for the database instance is made of signals that emanate from the instance itself. The same is true for the operating system models, which gives rise to compartmentalized and semi-isolated diagnoses.

The improvements of the current embodiment in this regard are to replicate the models of all system components the target is dependent on, and to stitch these models in a fashion that reflects their overall topology and service interactions.

When monitoring a database instance as a target, a composite model is used to achieve a consolidated and integrated awareness of the target's state. A model of the host operating system is cloned and attached to the instance own model. Results produced by the host model are propagated as input into the instance model to provide clues about the external but impacting state. More models can be assembled in the same fashion.

To operate this composite model, some or all necessary data are merged together and fed as input during monitoring. Since data merging involves synchronization among all sources of data, the present approach can use time as the synching dimension.

An issue also arises with respect to which particular external models should be selected for the composite model construction. In some embodiments, a cross-reference between the models at their generation phase is preserved as a guiding selection attribute.

Therefore, since the performance of the diagnoses and prognoses process is measured by its accuracy in terms of the rate of false positives and false negatives in the outcome decision, the present approach can be applied to significantly improve the accuracy of the diagnoses and prognoses processes that are built with machine learning techniques.

Another embodiment pertains to an approach for implementing online performance assessment of predictive models.

There is a risk of dealing with false outcomes neglectfully if the performance of applied predictive models is not regularly verified. To handle this problem, some in the industry may choose to retire their models periodically after a certain period of time, say three to six months from their deployment, and generate new ones. However, there are no commonly established processes in the industry to validate and possibly retire machine learning-based predictive models after they have been deployed.

According to some embodiments, the invention provides comparative analysis and tracking of long-term residual behavior of active models to determine if a persistent drift expands beyond an acceptable threshold. The governing assumptions underpinning the algorithms of this method follow that any fault in the target system would not last for extended periods and that, in general, model diagnostic findings should be corroborated by the target key performance indicator.

In order to make sure that online predictive models continue to perform reasonably well, the approach evaluates their performance continually while they are plugged into operation. The performance assessment method is employed to implement the continual sizing up of a model's residuals and the degree of correlations between the models' output decisions and the projections of the target's key performance indicators.

All (or a significant amount of) diagnostics and prognostic data produced by the model, as well as the monitoring data, can be stored in a central database alongside the key performance indicators. When the model is performing well, its residuals tend to resemble those produced with the validation dataset—except when failures are detected. The KPI's readings, on their part, would corroborate the models' diagnostics and prognostics findings.

When operational models begin to lose their effectiveness, either gradually or otherwise, their residuals become distinctively worse than usual. The challenge is on how to correctly differentiate between cases of bad residuals caused by model lack of efficacy (what is the main concern) versus the case of what could be the manifestations of temporary failures. The present methodology builds on a simple assumption that real faults on the monitored target will not continue to exist for an extended period of time (otherwise it will defeat the purpose of having the target as a useful service provider). In other words, if the residuals time series is segmented into small contiguous chunks, then any impermanent faults would have resulted in a small/finite number (but not all) of unusual residual chunks. The majority would therefore reflect the long term changes in the monitored system behavior.

This approach therefore greatly enhances the operational quality of machine learning solutions, as well as establishes robust measures to track the performance of active predictive models. This allows the system to create alerts when these models become inadequate as their target system conditions change significantly over time. It will also help keep the machine learning product well-performing and reduces the chances of false results.

System Architecture Overview

Figure 7:
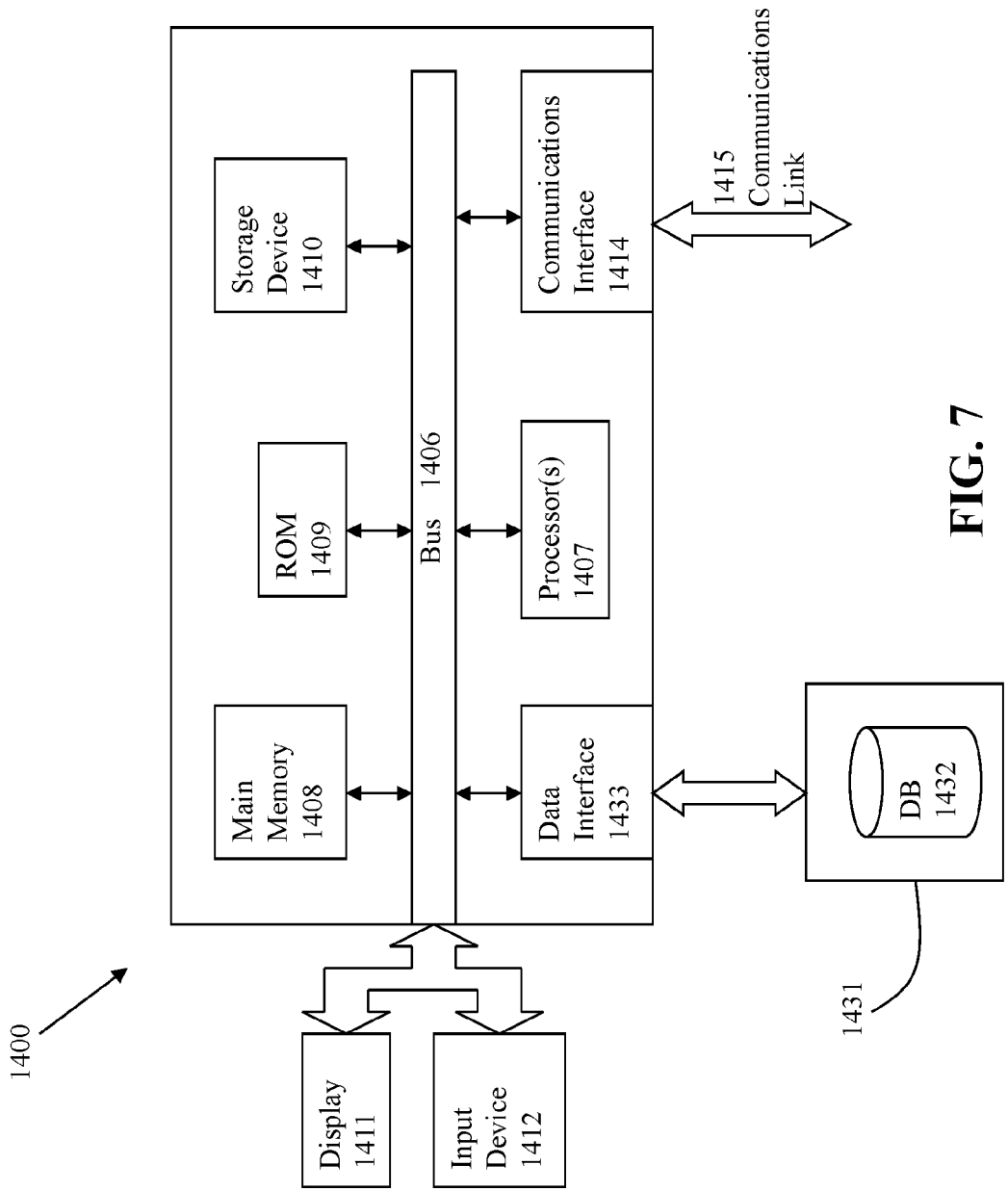
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 8:
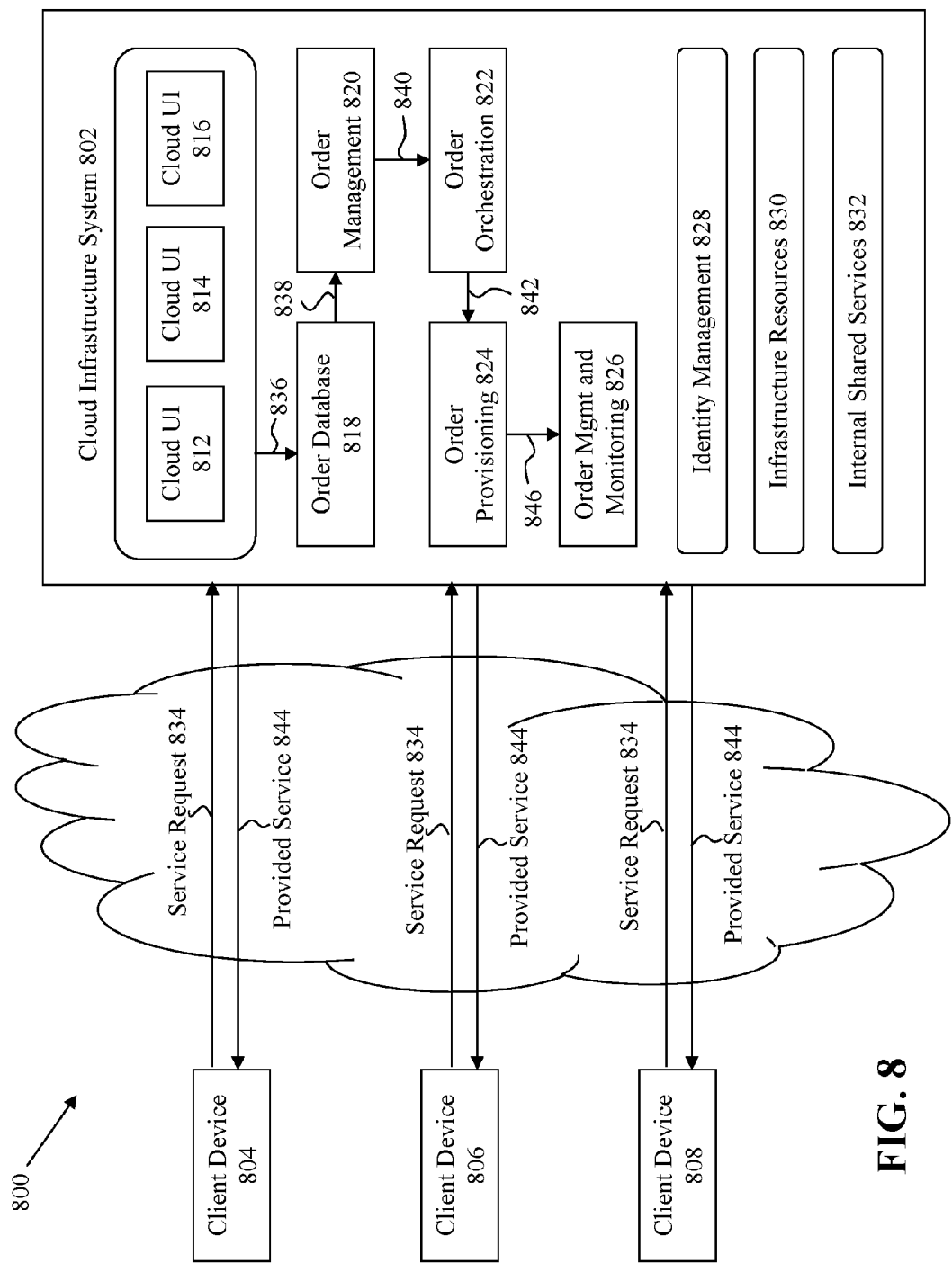
FIG. 8 is a block diagram of one or more components of a system environment in which services may be offered as cloud services, in accordance with an embodiment of the present invention.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for imputing data for a learning system, comprising:
    collecting data from a monitored target system;
    determining one or more levels of missingness for the data collected from the monitored target system;
    selecting, from among a plurality of imputation techniques, a selected imputation technique based at least in part upon the one or more levels of missingness for the data, wherein expectation maximization (EM) is selected as the selected imputation technique if it is determined that both an overall level of missing data and individual levels of missing data for signals are at one or more designated thresholds, and an external data source is accessed to generate an EM seed for the expectation maximization when insufficient seed data exists within the data collected from the monitored target system;
    imputing missing data using the selected imputation technique to generate training data; and
    performing model training with the training data.

2. The method of claim 1, wherein the one or more levels of missingness for the data comprise a first factor corresponding to an overall degree of missingness for the data, a second factor corresponding to one or more degrees of missingness for individual signals within a dataset, and a third factor corresponding to missingness degrees for different signal patterns in the data.

3. The method of claim 1, wherein the plurality of imputation techniques comprises some or all of a first imputation technique that performs expectation maximization to impute the missing data at a first level of missingness, a second imputation technique that performs the expectation maximization with external data at a second level of missingness, a third imputation technique that generates the training data using predicted values from a predictive model at a third level of missingness, or a fourth imputation technique that performs simulation to generate the training data at a fourth level of missingness.

4. The method of claim 1, wherein a second imputation technique is selected to impute the missing data when a first imputation technique does not successfully generate the missing data.

5. The method of claim 1, wherein the model training generates a predictive model that is employed for health monitoring of a database system.

6. A system for imputing data for a machine learning system, comprising:
    a processor;
    a memory for holding programmable code; and
    wherein the programmable code includes instructions for collecting data from a monitored target system; determining one or more levels of missingness for the data collected from the monitored target system; selecting, from among a plurality of imputation techniques, a selected imputation technique based at least in part upon the one or more levels of missingness for the data, wherein expectation maximization (EM) is selected as the selected imputation technique if it is determined that both an overall level of missing data and individual levels of missing data for signals are at one or more designated thresholds, and an external data source is accessed to generate an EM seed for the expectation maximization when insufficient seed data exists within the data collected from the monitored target system; imputing missing data using the selected imputation technique to generate training data; and performing model training with the training data.

7. The system of claim 6, wherein the one or more levels of missingness for the data comprise a first factor corresponding to an overall degree of missingness for the data, a second factor corresponding to one or more degrees of missingness for individual signals within a dataset, and a third factor corresponding to missingness degrees for different signal patterns in the data.

8. The system of claim 6, wherein the plurality of imputation techniques comprises some or all of a first imputation technique that performs expectation maximization to impute the missing data at a first level of missingness, a second imputation technique that performs the expectation maximization with external data at a second level of missingness, a third imputation technique that generates the training data using predicted values from a predictive model at a third level of missingness, or a fourth imputation technique that performs simulation to generate the training data at a fourth level of missingness.

9. The system of claim 6, wherein a second imputation technique is selected to impute the missing data when a first imputation technique does not successfully generate the missing data.

10. The system of claim 6, wherein the model training generates a predictive model that is employed for health monitoring of a database system.

11. A computer program product embodied on a non-transitory computer readable medium, the non-transitory computer readable medium having stored thereon a sequence of instructions which, when executed by a processor, executes a method comprising:
   collecting data from a monitored target system;
   determining one or more levels of missingness for the data collected from the monitored target system;
   selecting, from among a plurality of imputation techniques, a selected imputation technique based at least in part upon the one or more levels of missingness for the data, wherein expectation maximization (EM) is selected as the selected imputation technique if it is determined that both an overall level of missing data and individual levels of missing data for signals are at one or more designated thresholds, and an external data source is accessed to generate an EM seed for the expectation maximization when insufficient seed data exists within the data collected from the monitored target system;
   imputing missing data using the selected imputation technique to generate training data; and
   performing model training with the training data.

12. The computer program product of claim 11, wherein the one or more levels of missingness for the data comprise a first factor corresponding to an overall degree of missingness for the data, a second factor corresponding to one or more degrees of missingness for individual signals within a dataset, and a third factor corresponding to missingness degrees for different signal patterns in the data.

13. The computer program product of claim 11, wherein the plurality of imputation techniques comprises some or all of a first imputation technique that performs expectation maximization to impute the missing data at a first level of missingness, a second imputation technique that performs the expectation maximization with external data at a second level of missingness, a third imputation technique that generates the training data using predicted values from a predictive model at a third level of missingness, or a fourth imputation technique that performs simulation to generate the training data at a fourth level of missingness.

14. The computer program product of claim 11, wherein a second imputation technique is selected to impute the missing data when a first imputation technique does not successfully generate the missing data.

15. The computer program product of claim 11, wherein the model training generates a predictive model that is employed for health monitoring of a database system.

* * * * *

UNITED STATES PATENT AND TRADEMARK OFFICE
CERTIFICATE OF CORRECTION

PATENT NO. : 10,409,789 B2  
APPLICATION NO. : 15/707500  
DATED : September 10, 2019  
INVENTOR(S) : Zoll et al.

Page 1 of 1

It is certified that error appears in the above-identified patent and that said Letters Patent is hereby corrected as shown below:

On the Title Page

In Column 1, under Inventors, Lines 6-7, delete "Redwood (CA);" and insert -- Redwood City, CA (US); --, therefor.

In the Specification

In Column 1, Line 50, after "state" delete "the".

Signed and Sealed this  
Eighth Day of September, 2020

Andrei Iancu  
*Director of the United States Patent and Trademark Office*